(12) United States Patent
Li et al.

(10) Patent No.: US 12,132,574 B2
(45) Date of Patent: Oct. 29, 2024

(54) FEEDBACK INFORMATION SENDING METHOD AND APPARATUS

(71) Applicant: HUAWEI TECHNOLOGIES CO., LTD., Guangdong (CN)

(72) Inventors: Yiqing Li, Shenzhen (CN); Yuchen Guo, Shenzhen (CN); Dandan Liang, Shenzhen (CN); Jian Yu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 315 days.

(21) Appl. No.: 17/739,972

(22) Filed: May 9, 2022

(65) Prior Publication Data
US 2022/0263604 A1    Aug. 18, 2022

Related U.S. Application Data

(63) Continuation of application No. PCT/CN2020/127427, filed on Nov. 9, 2020.

(30) Foreign Application Priority Data

Nov. 10, 2019    (CN) .......................... 201911091549.5

(51) Int. Cl.
*H04L 5/00*    (2006.01)
*H04L 1/1812*    (2023.01)

(52) U.S. Cl.
CPC .......... *H04L 1/1812* (2013.01); *H04L 5/0055* (2013.01)

(58) Field of Classification Search
CPC ... H04L 1/1685; H04L 1/1812; H04L 1/1854; H04L 1/188; H04L 1/1896; H04L 47/26; H04L 5/0055

(Continued)

(56) References Cited

U.S. PATENT DOCUMENTS

2014/0126580 A1    5/2014    Sampath et al.
2016/0380727 A1    12/2016    Ryu et al.
(Continued)

FOREIGN PATENT DOCUMENTS

CN    101404810 A    4/2009
EP    3266158 B1    8/2020
(Continued)

OTHER PUBLICATIONS

IEEE 802.11-19/1553r0, Taewon Song et al., Consideration on HARQ feedback, Sep. 2019, 15 pages.

(Continued)

*Primary Examiner* — Robert J Lopata
(74) *Attorney, Agent, or Firm* — WOMBLE BOND DICKINSON (US) LLP

(57) ABSTRACT

This application provides methods and apparatus for sending feedback information. By binding a BAR-BA feedback manner, that is, first a request and then a feedback, when it is determined that data retransmission is performed by using a hybrid automatic repeat request (HARQ) mechanism, duration of an acknowledgment operation performed by a data receive end on retransmitted data may be increased. Alternatively, the receive end estimates duration required for feeding back a receiving status of the retransmitted data, and feeds back the duration to a transmit end. The transmit end may therefore adaptively adjust duration of the retransmitted data based on a feedback capability of the receive end, to ensure that the feedback of the receive end on the receiving status of the retransmitted data is within a short inter-frame space (SIFS).

20 Claims, 11 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2020/0052832 A1* | 2/2020 | Tian ....................... | H04L 1/1614 |
| 2020/0100286 A1* | 3/2020 | Xu ........................... | H04L 1/187 |
| 2021/0014006 A1* | 1/2021 | Duan ...................... | H04L 1/1812 |
| 2022/0060291 A1* | 2/2022 | Yang ...................... | H04L 1/1607 |
| 2022/0167319 A1* | 5/2022 | Song ...................... | H04L 1/1614 |
| 2022/0231797 A1* | 7/2022 | Song ...................... | H04L 1/1861 |

FOREIGN PATENT DOCUMENTS

| | | |
|---|---|---|
| WO | 2015006640 A1 | 1/2015 |
| WO | 2016144817 A1 | 9/2016 |
| WO | 2019132981 A1 | 7/2019 |

OTHER PUBLICATIONS

R1-1705653, Lenovo et al., Discussion on enhanced HARQ feedback and CBG-based partial retransmission, 3GPP TSG RAN WG1 Meeting #88bis, Spokane, USA Apr. 3-7, 2017, 5 pages.

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

\* cited by examiner

FEEDBACK INFORMATION SENDING METHOD AND APPARATUS

CROSS-REFERENCE TO RELATED APPLICATIONS

This application is a continuation of International Application No. PCT/CN2020/127427, filed on Nov. 9, 2020, which claims priority to Chinese Patent Application No. 201911091549.5, filed on Nov. 10, 2019. The disclosures of the aforementioned applications are hereby incorporated by reference in their entireties.

TECHNICAL FIELD

This application relates to the field of wireless communications technologies, and more specifically, to a feedback information sending method and an apparatus.

BACKGROUND

In a hybrid automatic repeat request (HARD) mechanism, a transmit end sends a data packet to a receive end, and the receive end provides a feedback to the transmit end based on a receiving status after receiving the data packet. For example, if the receive end correctly receives the data packet, the receive end sends an acknowledgment (ACK) to the transmit end. If the receive end does not correctly receive the data packet, the receive end stores a maximum likelihood rate (LLR) of an error part in a current transmission, sends a negative acknowledgment (NACK) to the transmit end with reference to all LLRs of a same error part in previous transmissions, and notifies the transmit end of parts that are not correctly received. When receiving the NACK, the transmit end combines the LLRs of the error data part and retransmits the error data part. The receive end acknowledges whether a media access control protocol data unit (MAC PDU or MPDU) to which the retransmitted data belongs is correctly received, and replies a block acknowledgment (BA) to the transmit end based on an acknowledgment result.

It can be learned that even if an error occurs only on a small amount of data, the receive end needs to perform an acknowledgment operation on a receiving status of an MPDU to which the error data belongs. The acknowledgment operation is relatively time consuming, and therefore the receive end may not be able to reply a BA in a short inter-frame space (SIFS). If the transmit end does not receive a reply from the receive end in the SIFS, the transmit end determines that the retransmission fails and continues to perform a retransmission. It can be learned that if the receive end cannot reply the BA in the SIFS, retransmission performance is adversely affected. For example, the transmit end incorrectly determines a receiving status of the retransmitted data, and continuous retransmissions cause a waste of retransmission resources.

SUMMARY

This application provides a feedback information sending method and an apparatus, to improve retransmission performance.

According to a first aspect, this application provides a feedback information sending method. The method includes: A first communications apparatus receives a negative acknowledgment from a second communications apparatus, where the negative acknowledgment is used to indicate that a first MPDU included in a first PPDU sent by the first communications apparatus to the second communications apparatus is not correctly received; the first communications apparatus sends a second PPDU to the second communications apparatus, where a preamble in the second PPDU carries first indication information, the first indication information is used to indicate the second PPDU to retransmit, by using HARQ, data that is in the first MPDU and that is not correctly received, and is further used to indicate the second communications apparatus to send, to the first communications apparatus after receiving a feedback request from the first communications apparatus, feedback information of the second PPDU, and the feedback information of the second PPDU is used to indicate whether the second PPDU is correctly received; the first communications apparatus sends the feedback request to the second communications apparatus; and the first communications apparatus receives the feedback information of the second PPDU from the second communications apparatus.

In data transmission in the technical solution of this application, when it is determined that the HARQ is used to retransmit the data that is not correctly received, the first communications apparatus and the second communications apparatus use a black acknowledgment request-block acknowledgment (BAR-BA) manner. In other words, the HARQ and the BAR-BA feedback manner are bound. After the first communications apparatus receives the negative acknowledgment indicating that data is not correctly received from the second communications apparatus, the first communications apparatus needs to retransmit the data that is not correctly received. If the first communications apparatus determines to feed back a receiving status of the retransmitted data by using the HARQ, the first communications apparatus includes first indication information in the second PPDU sent to the second communications apparatus, where the first indication information is used to indicate to feed back the receiving status of the retransmitted data by using the HARQ, and to adopt the BAR-BA feedback manner. Herein, the BAR-BA feedback manner means that after the second communications apparatus receives a BAR from the first communications apparatus, the second communications apparatus sends, to the first communications apparatus, a BA indicating whether a PPDU in which the retransmitted data is located is correctly received.

It should be understood that the PPDU in which the retransmitted data is located is referred to as the second PPDU in this specification.

However, in a conventional HARQ mechanism, the second communications apparatus receives the retransmitted data from the first communications apparatus and performs a block acknowledgment operation. After completing sending of the retransmitted data, the first communications apparatus enters an SIFS. However, it is time-consuming for the second communications apparatus to perform the block acknowledgment operation, which may exceed duration of the SIFS. As a result, the transmit end mistakenly determines that the retransmission fails, and continues to perform a retransmission, causing a waste of retransmission resources.

By contrast, in this application, the HARQ and the BAR-BA feedback manner are bound. After the second communications apparatus receives the retransmitted data, duration for the second communications apparatus to determine whether the second PPDU in which the retransmitted data is located is correctly received is extended. After the feedback request from the first communications apparatus is received, the receiving status of the PPDU in which the retransmitted data is located is fed back to the first communications apparatus, so that more time is left for the second communications apparatus to perform the block acknowledgment operation, and the feedback information from the second communications apparatus may be within the SIFS. In other words, the first communications apparatus may receive, within the SIFS, the feedback information that is sent by the second communications apparatus and that indicates whether the second PPDU is correctly received, to avoid that the first communications apparatus mistakenly determines the receiving status of the retransmitted data, and reduce a waste of retransmitted resources.

With reference to the first aspect, in some embodiments of the first aspect, the second PPDU is a high efficiency single user PPDU (HE SU PPDU), and a signaling field A in the HE SU PPDU carries the first indication information; or the second PPDU is a high efficiency multiple user PPDU (HE MU PPDU), and a signaling field A in the HE MU PPDU carries the first indication information.

For PPDUs of different types, the first communications apparatus carries the first indication information by using a signaling field A included in a PPDU, to avoid additional signaling overheads.

Optionally, the first indication information may be carried by using a reserved bit of the field A. For example, if the second PPDU is an HE SU PPDU, the first indication information may be carried by using B14 of SIG-A in a preamble in the HE SU PPDU. For another example, if the second PPDU is an HE MU PPDU, the first indication information may be carried by using B7 of SIG-A in a preamble in the HE MU PPDU.

According to a second aspect, this application provides a feedback information sending method. The method includes: A first communications apparatus receives a negative acknowledgment from a second communications apparatus, where the negative acknowledgment is used to indicate that a first MPDU included in a first PPDU sent by the first communications apparatus to the second communications apparatus is not correctly received, the negative acknowledgment carries second indication information, and the second indication information is used to indicate to retransmit, by using HARQ, data that is in the first MPDU and that is not correctly received, and is further used to indicate the second communications apparatus to send, to the first communications apparatus after receiving a feedback request from the first communications apparatus, feedback information of a PPDU in which the retransmitted data is located; the first communications apparatus sends a second PPDU to the second communications apparatus, where the second PPDU retransmits, by using the HARQ, the data that is in the first MPDU and that is not correctly received; the first communications apparatus sends the feedback request to the second communications apparatus; and the first communications apparatus receives the feedback information of the second PPDU from the second communications apparatus.

Similar to the feedback information sending method in the first aspect, in the method in the second aspect, the HARQ and a BAR-BA feedback manner are also bound. When a receive end of the data (namely, the second communications apparatus) does not correctly receive a part of data from a transmit end (namely, the first communications apparatus), the first communications apparatus needs to retransmit the data that is not correctly received. If the second communications apparatus determines to adopt the HARQ, the second communications apparatus includes second indication information in the negative acknowledgment sent to the first communications apparatus, where the second indication information is used to indicate to feed back a receiving status of the retransmitted data by using the HARQ, and to adopt the BAR-BA feedback manner. Similarly, by binding the HARQ mechanism and the BAR-BA, the second communications apparatus may have more time to perform a block acknowledgment operation, and further, a feedback of the second communications apparatus on a receiving status of an MPDU to which the retransmitted data belongs may be within an SIFS. This may prevent the first communications apparatus from mistakenly determining the receiving status of the retransmitted data, thereby reducing a waste of retransmission resources.

According to a third aspect, this application provides a feedback information sending method. The method includes: A first communications apparatus receives a negative acknowledgment from a second communications apparatus, where the negative acknowledgment is used to indicate that a first MPDU included in a first PPDU sent by the first communications apparatus to the second communications apparatus is not correctly received; and the first communications apparatus sends a second PPDU to the second communications apparatus based on capability information of the second communications apparatus, where the second PPDU includes a second MPDU and an additional part, and a sum of duration of the additional part and a short interframe space SIFS is greater than duration required by the second communications apparatus to feed back to the first communications apparatus whether an MPDU to which retransmitted data belongs is correctly received.

In this technical solution, the first communications apparatus may learn about, based on the capability information of the second communications apparatus, the duration required by the second communications apparatus to feed back to the first communications apparatus whether the MPDU to which the retransmitted data belongs is correctly received. Therefore, when the feedback duration of the second communications apparatus is longer than the SIFS, the first communications apparatus adds the additional part after the MPDU to which the retransmitted data belongs, so that the sum of the duration of the additional part and the duration of the SIFS is greater than the feedback duration of the second communications apparatus. In this way, it can be ensured that a BA fed back by the second communications apparatus is within the SIFS.

Therefore, it can avoid a misjudgment made by the first communications apparatus when the first communications apparatus fails to receive a feedback of the second communications apparatus on the receiving status of the MPDU to which the retransmitted data belongs within the SIFS. Further, it can avoid a waste of retransmission resources caused by continuous retransmissions.

With reference to the third aspect, in some embodiments of the third aspect, the method further includes: The first communications apparatus receives the capability information from the second communications apparatus.

Optionally, before sending the first PPDU to the second communications apparatus, the first communications apparatus may obtain the capability information from the second communications apparatus. For example, after the first communications apparatus establishes a connection to the second communications apparatus, the second communications apparatus autonomously reports capability information of the second communications apparatus. Alternatively, after the first communications apparatus establishes a connection to the second communications apparatus, the second communications apparatus may feed back capability information of the second communications apparatus to the first communications apparatus based on a request of the first communications apparatus.

With reference to the third aspect, in some embodiments of the third aspect, the additional part is padding of the second MPDU, or the additional part is newly transmitted data.

It is not complex to pad retransmitted data to prolong processing time for the second communications apparatus to perform a block acknowledgment operation. Alternatively, by aggregating newly transmitted data after data is retransmitted, processing time for the second communications apparatus to perform a block acknowledgment operation can be prolonged, so that the feedback of the second communications apparatus is within the SIFS. In addition, transmission efficiency can be improved.

With reference to the third aspect, in some embodiments of the third aspect, the capability information is used to indicate a delay for the second communications apparatus to feed back to the first communications apparatus whether the MPDU to which the retransmitted data belongs is correctly received.

With reference to the third aspect, in some embodiments of the third aspect, the capability information is used to indicate maximum duration that is of a PPDU in which the retransmitted data is located and that is acceptable to the second communications apparatus, and/or a maximum quantity of MPDUs to which the retransmitted data belongs.

The foregoing embodiments provide a plurality of indicators for the second communications apparatus to estimate the delay for the second communications apparatus to feed back the retransmitted data, thereby improving feedback flexibility.

With reference to the third aspect, in some embodiments of the third aspect, before that the first communications apparatus sends the second PPDU to the second communications apparatus based on the capability information, the method further includes: When the duration indicated by the capability information is greater than the SIFS, the first communications apparatus adds the additional part after the second MPDU based on the capability information to generate the second PPDU.

With reference to the third aspect, in some embodiments of the third aspect, that the capability information is used to indicate the duration required by the second communications apparatus to feed back to the first communications apparatus whether the MPDU to which the retransmitted data belongs is correctly received includes: The capability information carries a level identifier corresponding to the duration required by the second communications apparatus to feed back to the first communications apparatus whether the MPDU to which the retransmitted data belongs is correctly received, where different duration required by the second communications apparatus to feed back to the first communications apparatus whether the MPDU to which the retransmitted data belongs is correctly received corresponds to different level identifiers.

A level identifier is set for a feedback delay of the second communications apparatus. In this way, when sending the feedback delay to the first communications apparatus, the second communications apparatus may directly send the level identifier to the first communications apparatus without indicating a specific feedback delay, which helps reduce indication bit overheads.

According to a fourth aspect, this application provides a feedback information sending method. The method includes: A first communications apparatus sends a first preamble to a second communications apparatus on a first link, and sends data to the second communications apparatus starting from a moment when the first preamble ends; and if the first communications apparatus does not receive first feedback information on a second link within preset duration, the first communications apparatus stops sending data to the second communications apparatus, where the first feedback information is used to indicate that the second communications apparatus correctly receives the first preamble.

Considering that in a HARQ mechanism, a preamble and a data part are separately encoded. Therefore, this application proposes that a receiving status of a preamble may be fed back in advance. In other words, after receiving the preamble, the second communications apparatus does not need to wait for completion of receiving all the data, and may feed back whether the preamble is correctly received, which can save time.

The second communications apparatus separately feeds back a receiving status of the preamble and a receiving status of the data. In this way, when the preamble is received incorrectly, the first communications apparatus stops sending subsequent data in time, to avoid a waste of transmission resources and enter a retransmission in time.

When the second communications apparatus correctly receives the preamble, the second communications apparatus does not need to wait for data to be completely received, and may feed back an acknowledgment to the first communications apparatus only for a receiving status of the first preamble in advance. After receiving the acknowledgment, the first communications apparatus continues to send data.

Optionally, the first communications apparatus sends the first preamble to the second communications apparatus on the first link, and sends data to the second communications apparatus starting from the moment when the first preamble ends. If the first communications apparatus receives the first feedback information on the second link within the preset duration, the first communications apparatus continues to send data to the second communications apparatus on the first link, where the first feedback information is used to indicate that the second communications apparatus correctly receives the first preamble.

With reference to the fourth aspect, in some embodiments of the fourth aspect, the first preamble includes an indication field, and the indication field is used to indicate the second communications apparatus to feed back whether the first preamble is correctly received after receiving the first preamble.

The first communications apparatus indicates, by using the preamble, the second communications apparatus to send a feedback on the preamble in advance, which may avoid extra signaling and resource overheads caused by a dedicated notification to the second communications apparatus.

With reference to the fourth aspect, in some embodiments of the fourth aspect, after that the first communications apparatus stops sending data to the second communications apparatus, the method further includes: The first communications apparatus sends a second preamble to the second communications apparatus, and retransmits the data starting from a moment when the second preamble ends; and if the first communications apparatus receives second feedback information on the second link within the preset duration, the first communications apparatus continues to send data to the second communications apparatus, where the second feedback information is used to indicate that the second communications apparatus correctly receives the second preamble.

With reference to the fourth aspect, in some embodiments of the fourth aspect, before that the first communications apparatus sends the first preamble to the second communications apparatus on the first link, the method further includes: The first communications apparatus sends a detection signal to the second communications apparatus on the first link, and attempts to receive a response signal from the second communications apparatus on the second link; and if the first communications apparatus receives the response signal from the second communications apparatus on the second link, the first communications apparatus confirms that the first link and the second link are in an idle state.

This embodiment provides a method for the second communications apparatus to feed back a receiving status of retransmitted data to the first communications apparatus in a multi-link scenario. With the method, the first communications apparatus can learn about a receiving status of a preamble in advance. When the preamble is not correctly received, the first communications apparatus stops sending data in time, and enters a retransmission, thereby avoiding a waste of transmission resources.

With reference to the fourth aspect, in some embodiments of the fourth aspect, the detection signal includes request to send (RTS) and/or clear to send (CTS).

According to a fifth aspect, this application provides a feedback information sending method. The method includes: A second communications apparatus sends a negative acknowledgment to a first communications apparatus, where the negative acknowledgment is used to indicate that a first MPDU included in a first PPDU sent by the first communications apparatus to the second communications apparatus is not correctly received; the second communications apparatus receives a second PPDU from the first communications apparatus, where a preamble in the second PPDU carries first indication information, the first indication information is used to indicate the second PPDU to retransmit, by using HARQ, data that is in the first MPDU and that is not correctly received, and is further used to indicate the second communications apparatus to send, to the first communications apparatus after receiving a feedback request from the first communications apparatus, feedback information of the second PPDU, and the feedback information of the second PPDU is used to indicate whether the second PPDU is correctly received; the second communications apparatus receives the feedback request from the first communications apparatus; and the second communications apparatus sends the feedback information of the second PPDU to the first communications apparatus.

With reference to the fifth aspect, in some embodiments of the fifth aspect, the second PPDU is a HE SU PPDU, and a signaling field A in the HE SU PPDU carries the first indication information; or the second PPDU is a HE MU PPDU, and a signaling field A in the HE MU PPDU carries the first indication information.

According to a sixth aspect, this application provides a feedback information sending method. The method includes: A second communications apparatus sends a negative acknowledgment to a first communications apparatus, where the negative acknowledgment is used to indicate that a first MPDU included in a first PPDU sent by the first communications apparatus to the second communications apparatus is not correctly received, the negative acknowledgment carries second indication information, the second indication information is used to indicate to retransmit, by using HARQ, data that is in the first MPDU and that is not correctly received, and is further used to indicate the second communications apparatus to send, to the first communications apparatus after receiving a feedback request from the first communications apparatus, feedback information of a PPDU in which the retransmitted data is located, and the feedback information of the PPDU in which the retransmitted data is located is used to indicate whether the PPDU in which the retransmitted data is located is correctly received; the second communications apparatus receives a second PPDU from the first communications apparatus, where the second PPDU retransmits, by using the HARQ, the data that is in the first MPDU and that is not correctly received; the second communications apparatus receives the feedback request from the first communications apparatus; and the second communications apparatus sends the feedback information of the second PPDU to the first communications apparatus.

According to a seventh aspect, this application provides a feedback information sending method. The method includes: A second communications apparatus sends a negative acknowledgment to a first communications apparatus, where the negative acknowledgment is used to indicate that a first MPDU included in a first PPDU sent by the first communications apparatus to the second communications apparatus is not correctly received; and the second communications apparatus receives a second PPDU from the first communications apparatus, where the second PPDU includes a second MPDU and an additional part, the second PPDU retransmits, by using HARQ, data that is in the first MPDU and that is not correctly received, and a sum of duration of the additional part and a short inter-frame space SIFS is greater than duration required by the second communications apparatus to feed back to the first communications apparatus whether an MPDU to which retransmitted data belongs is correctly received.

With reference to the seventh aspect, in some embodiments of the seventh aspect, the second communications apparatus sends capability information of the second communications apparatus to the first communications apparatus. The capability information is used to indicate the duration required by the second communications apparatus to feed back to the first communications apparatus whether the MPDU to which the retransmitted data belongs is correctly received.

With reference to the seventh aspect, in some embodiments of the seventh aspect, the additional part is padding of the second MPDU, or the additional part is newly transmitted data.

With reference to the seventh aspect, in some embodiments of the seventh aspect, the capability information is used to indicate a delay for the second communications apparatus to feed back to the first communications apparatus whether the MPDU to which the retransmitted data belongs is correctly received.

With reference to the seventh aspect, in some embodiments of the seventh aspect, the capability information is used to indicate maximum duration that is of a PPDU in which the retransmitted data is located and that is acceptable to the second communications apparatus, and/or a maximum quantity of MPDUs to which the retransmitted data belongs.

With reference to the seventh aspect, in some embodiments of the seventh aspect, that the second communications apparatus receives the second PPDU from the first communications apparatus includes: When the duration required by the second communications apparatus to feed back to the first communications apparatus whether the MPDU to which the retransmitted data belongs is correctly received is greater than the SIFS, the second PPDU received by the second communications apparatus from the first communications apparatus includes the second MPDU and the additional part.

With reference to the seventh aspect, in some embodiments of the seventh aspect, that the capability information is used to indicate the delay for the second communications apparatus to feed back to the first communications apparatus whether the MPDU to which the retransmitted data belongs is correctly received includes:

The capability information carries a level identifier corresponding to the duration required by the second communications apparatus to feed back to the first communications apparatus whether the MPDU to which the retransmitted data belongs is correctly received, where different duration required by the second communications apparatus to feed back to the first communications apparatus whether the MPDU to which the retransmitted data belongs is correctly received corresponds to different level identifiers.

According to an eighth aspect, this application provides a feedback information sending method. The method includes: A second communications apparatus receives, on a first link, a first preamble sent by the first communications apparatus, and receives data starting from a moment when the first preamble ends; and when the second communications apparatus does not correctly receive the first preamble, the second communications apparatus does not feed back a receiving status of the first preamble to the first communications apparatus.

With reference to the eighth aspect, in some embodiments of the eighth aspect, the first preamble includes an indication field, and the indication field is used to indicate the second communications apparatus to feed back whether the first preamble is correctly received after receiving the first preamble.

With reference to the eighth aspect, in some embodiments of the eighth aspect, the method further includes: The second communications apparatus receives a second preamble from the first communications apparatus on the first link, and receives the retransmitted data starting from a moment when the second preamble ends; and when the second communications apparatus correctly receives the second preamble, the second communications apparatus sends second feedback information to the first communications apparatus on a second link, where the second feedback information is used to indicate that the second communications apparatus correctly receives the second preamble.

With reference to the eighth aspect, in some embodiments of the eighth aspect, before that the second communications apparatus receives, on the first link, the first preamble sent by the first communications apparatus, the method further includes: When the second communications apparatus receives a detection signal from the first communications apparatus on the first link, the second communications apparatus sends a response signal to the first communications apparatus on the second link.

With reference to the eighth aspect, in some embodiments of the eighth aspect, the detection signal includes RTS and/or CTS.

According to a ninth aspect, this application provides a communications apparatus. The communications apparatus has a function of implementing the method in the first aspect to the fourth aspect or any possible embodiment thereof. The function may be implemented by hardware, or may be implemented by hardware executing corresponding software. The hardware or the software includes one or more units corresponding to the foregoing functions.

According to a tenth aspect, this application provides a communications apparatus. The communications apparatus has a function of implementing the method in the fifth aspect to the eighth aspect or any possible embodiment thereof. The function may be implemented by hardware, or may be implemented by hardware executing corresponding software. The hardware or the software includes one or more units corresponding to the foregoing functions.

According to an eleventh aspect, this application provides a communications device, including one or more processors and one or more memories. The one or more memories are configured to store a computer program, and the one or more processors are configured to invoke and run the computer program stored in the one or more memories, to enable the communications device to perform the method in the first aspect to the fourth aspect or any possible embodiment thereof.

According to a twelfth aspect, this application provides a communications device, including one or more processors and one or more memories. The one or more memories are configured to store a computer program, and the one or more processors are configured to invoke and run the computer program stored in the one or more memories, to enable the communications device to perform the method in the fifth aspect to the eighth aspect or any possible embodiment thereof.

According to a thirteenth aspect, this application provides a chip, including one or more processors. The one or more processors are configured to read and execute a computer program stored in one or more memories, to perform the method in the first aspect to the fourth aspect and any possible embodiment thereof. The one or more memories are independently disposed outside the chip.

Optionally, the chip further includes one or more memories, and the one or more memories are connected to the one or more processors through circuits or wires.

Further, optionally, the chip further includes a communications interface.

According to a fourteenth aspect, this application provides a chip, including one or more processors. The one or more processors are configured to read and execute a computer program stored in one or more memories, to perform the method in the fifth aspect to the eighth aspect and any possible embodiment thereof. The one or more memories are independently disposed outside the chip.

Optionally, the chip further includes one or more memories, and the one or more memories are connected to the one or more processors through circuits or wires.

Further, optionally, the chip further includes a communications interface.

The chip mentioned in the foregoing aspects may be a system on chip (SOC), a baseband chip, or the like. The baseband chip may include a processor, a channel coder, a digital signal processor, a modem, a communications interface, and the like.

According to a fifteenth aspect, this application further provides a computer program product, including computer program code. When the computer program code runs on a computer, the computer performs the method in the first aspect to the fourth aspect or any possible embodiment thereof.

According to a sixteenth aspect, this application further provides a computer program product, including computer program code. When the computer program code runs on a computer, the computer performs the method in the fifth aspect to the eighth aspect or any possible embodiment thereof.

According to a seventeenth aspect, this application further provides a computer storage medium, where the computer-readable storage medium stores computer instructions; and when the computer instructions run on a computer, the computer is enabled to perform the method in the first aspect to the fourth aspect or any possible embodiment thereof.

According to an eighteenth aspect, this application further provides a computer storage medium, where the computer-readable storage medium stores computer instructions; and when the computer instructions run on a computer, the computer is enabled to perform the method in the fifth aspect to the eighth aspect or any possible embodiment thereof.

According to a nineteenth aspect, this application further provides a communications apparatus, including a processor and an interface circuit, where the interface circuit is configured to receive and transmit computer code or instructions to the processor, and the processor is configured to run the computer code or instructions, to perform the method in the first aspect to the fourth aspect or any possible embodiment thereof.

According to a twentieth aspect, this application further provides a communications apparatus, including a processor and an interface circuit, where the interface circuit is configured to receive and transmit computer code or instructions to the processor, and the processor is configured to run the computer code or instructions, to perform the method in the fifth aspect to the eighth aspect or any possible embodiment thereof.

According to a twenty-first aspect, this application provides a wireless communications system, including the communications device in the eleventh aspect and/or the communications device in the twelfth aspect.

DESCRIPTION OF EMBODIMENTS

The following describes the technical solutions in this application with reference to the accompanying drawings.

The technical solutions in this application are applicable to a scenario in which data transmission is performed between two communications devices. For example, uplink data transmission or downlink data transmission between a network device and a terminal device. For another example, data transmission between two terminal devices in a device to device (device to device, D2D) scenario.

Figure 1:
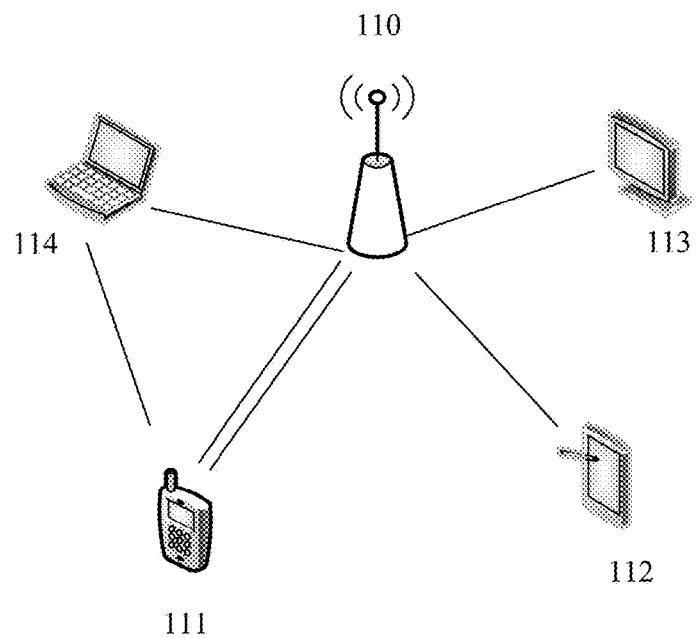
FIG. 1 is a schematic diagram of a system architecture applicable to the technical solutions in this application.

FIG. 1 is a schematic diagram of a system architecture applicable to the technical solutions in this application. As shown in FIG. 1, the wireless communications system may include at least one network device and at least one terminal device. The network device is 110 shown in FIG. 1, and the terminal devices are 111, 112, 113, and 114 shown in FIG. 1.

Optionally, the terminal devices and the network device are not limited to using a single-link connection, and may alternatively use a multi-link connection. This is not limited herein. For example, 110 is separately connected to 112, 113, and 114 by using a single link. A multi-link connection is used between 110 and 111. Two links are shown in FIG. 1.

As described above, the technical solutions in this application may be applied to data transmission between the network device and the terminal devices, and may also be applied to data transmission between the terminal devices, such as data transmission between 110 and 111, data transmission between 110 and 112, data transmission between 110 and 113, data transmission between 110 and 114, and data transmission between 111 and 114.

Therefore, the first communications apparatus and the second communications apparatus in the technical solutions in this application may be a network device or a terminal device. For example, one of the first communications apparatus and the second communications apparatus may be a network device, and the other is a terminal device. Alternatively, both the first communications apparatus and the second communications apparatus are terminal devices. This is not limited herein.

The scenario shown in FIG. 1 is merely used as an example, and is not limited to the foregoing scenario. Actually, the technical solutions in this application may be used for data transmission between any two communications devices.

The wireless communications system mentioned in this embodiment of this application includes but is not limited to a wireless local access network (WLAN) system, a narrowband internet of things (NB-IoT) system, a long term evolution (LTE) system, and a fifth generation (5G) communications system or a communications system after 5G, a device-to-device (D2D) communications system, and the like.

The network device mentioned in this application may be any device having a wireless transceiver function. The network device includes but is not limited to a node B (NB), an evolved node B (eNB) in a long term evolution (LTE) system, a radio network controller (RNC), an evolved LTE (eLTE) base station, or a gNB in a 5G system, or may be a base station controller (BSC), a base transceiver station (BTS), an access point (AP), a wireless backhaul node, a transmission point (TP), a transmission and reception point (TRP), a home node B (HNB), and the like. Alternatively, the network device may be a network node that constitutes a gNB or a transmission point, for example, a baseband unit (BBU), a distributed unit (DU), or the like. This is not limited in this application.

The terminal device mentioned in this application may also be referred to as user equipment (UE), a mobile console, an access terminal, a user unit, a user station, a mobile station, a remote station, a remote terminal, a mobile device, a terminal, a wireless communications device, a user agent, a station (STA) in a WLAN, a cellular telephone, a cordless telephone, a session initiation protocol (SIP) telephone, a wireless local loop (WLL) station, a personal digital assistant (PDA), a handheld device having a wireless communication function, a computing device, another processing device connected to a wireless modem, a vehicle-mounted device, a wearable device, a mobile station in a 5G network, and a terminal device in a future evolved public land mobile network (PLMN).

In a hybrid automatic repeat request (HARQ) mechanism, a transmit end sends a data packet to a receive end on a link. After receiving the data packet, the receive end sends a feedback to the transmit end based on a receiving status. For example, if the receive end correctly receives the data packet, the receive end sends an acknowledgment (ACK) to the transmit end. If the receive end does not correctly receive the data packet, the receive end stores an LLR of data that is incorrectly received this time, and sends a negative acknowledgment (NACK) to the transmit end with reference to all LLRs of a same error part in previous transmissions to notify the transmit end of parts that are incorrectly received. When receiving the NACK, the transmit end retransmits the error part whose LLRs are combined.

Figure 2:
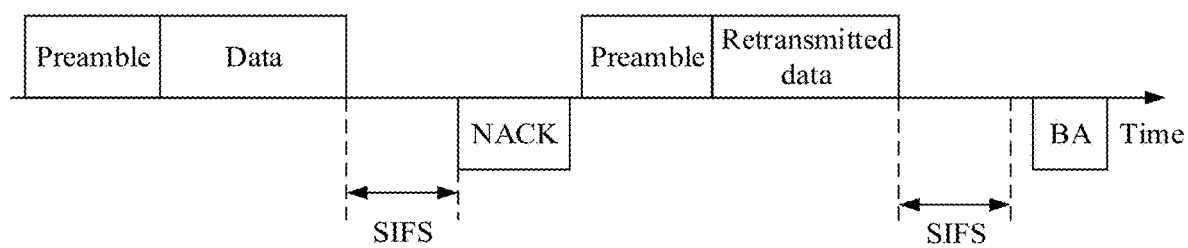
FIG. 2 is a schematic diagram showing a feedback of a data receiving status by using a HARQ mechanism.

FIG. 2 is a schematic diagram showing a feedback of a data receiving status by using a HARQ mechanism. As shown in FIG. 2, a transmit end sends a physical protocol data unit (PPDU) to a receive end, where the PPDU includes two parts: a preamble and a data part. After receiving data, the receive end feeds back a receiving status of the data to the transmit end. For example, if the receive end correctly receives the data, the receive end sends an ACK to the transmit end, which is not shown in FIG. 2. If the receive end does not correctly receive the data, the receive end sends a NACK to the transmit end to indicate data that is not correctly received. When the transmit end receives the NACK from the receive end, the transmit end retransmits the data that is not correctly received by the receive end. In the HARQ mechanism, for one transmission, the receive end stores an LLR of data that is incorrectly received in a current transmission process. If some data is not correctly received, the receive end sends all LLRs of a same error part in a plurality of previous transmissions to the transmit end, and notifies the transmit end of parts of the data that is incorrectly received. The transmit end retransmits the error part whose LLR is combined. The receive end acknowledges whether a media access control (MAC) protocol data unit (PDU) to which the retransmitted data belongs is correctly decoded, and replies a block acknowledgment (BA) to the transmit end.

It may be found that even if only a small amount of data is retransmitted, the receive end needs to perform an acknowledgment operation on whether the MPDU to which the retransmitted data belongs is correctly decoded. The acknowledgment operation is relatively time consuming, and therefore the receive end may not be able to reply a BA in a short inter-frame space (SIFS), or the receive end may reply a BA beyond an SIFS. As shown in FIG. 2, the BA is located after the SIFS.

In a wireless local area network, an SIFS indicates time required for a node to switch from a sending state to a receiving state and to perform correct decoding, or indicates time required for a node to switch from a receiving state to a sending state. For a HARQ feedback, if duration of a block acknowledgment operation performed by the receive end exceeds a value set by the SIFS, the transmit end does not receive, in the SIFS, a BA returned by the receive end, and further determines that the retransmission fails and continues to perform a retransmission.

It can be seen that, in the conventional HARQ mechanism, a delay for the receive end to reply a BA is relatively long, which has an adverse impact on retransmission performance. For example, the transmit end mistakenly determines a receiving status of the retransmitted data, and the transmit end continues to perform a retransmission due to a misjudgment, which further leads to a waste of retransmission resources.

Therefore, this application provides a feedback information sending method, which helps improve the retransmission performance. For example, it is ensured that the receive end replies the receiving status of the retransmitted data to the transmit end in the SIFS, and a waste of retransmission resources is reduced.

The following describes in detail feedback information sending solutions provided in this application.

This application separately provides solutions for the single-link scenario and the multi-link scenario shown in FIG. 1. The following describes the solutions one by one.

Scenario 1

A first communications apparatus and a second communications apparatus are connected by using a single link.

Figure 3:
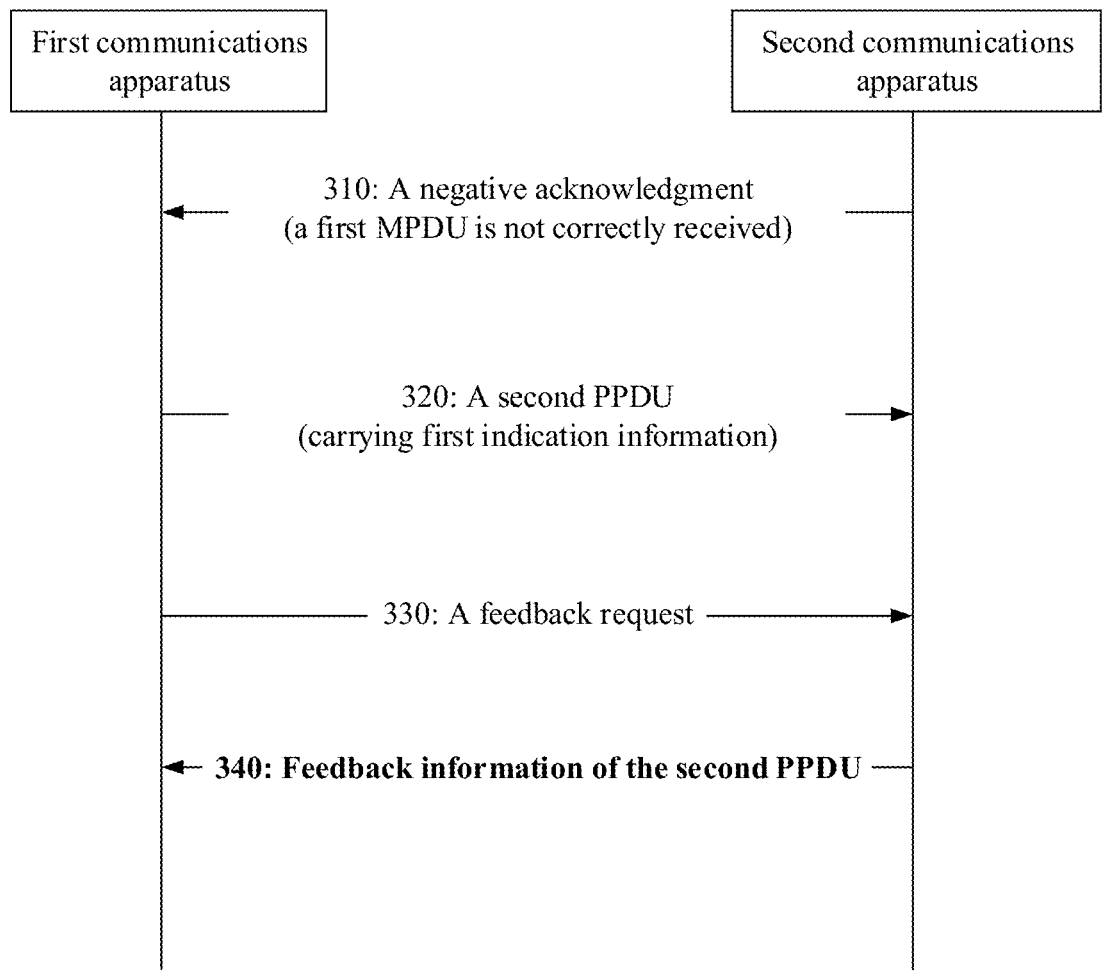
FIG. 3 is an interaction diagram of a feedback information sending method according to this application.

FIG. 3 is an interaction diagram of a feedback information sending method according to this application.

310: The first communications apparatus receives a negative acknowledgment from the second communications apparatus. The negative acknowledgment is used to indicate that a first MPDU included in a first PPDU sent by the first communications apparatus to the second communications apparatus is not correctly received.

Optionally, there may be one or more first MPDUs.

It should be understood that before operation 310, the first communications apparatus sends the first PPDU to the second communications apparatus, which is not shown in FIG. 3. The first PPDU includes a preamble and one or more MPDUs. The first MPDU may be any one or more MPDUs in the first PPDU.

320: The first communications apparatus sends a second PPDU to the second communications apparatus, where a preamble in the second PPDU carries first indication information. The first indication information is used to indicate the second PPDU to retransmit, by using HARQ, data that is in the first MPDU and that is not correctly received, and the first indication information is further used to indicate the second communications apparatus to send feedback information of the second PPDU to the first communications apparatus after receiving a feedback request from the first communications apparatus.

It can be seen that, in one aspect, the first indication information indicates that HARQ is used for retransmission. To be specific, the second PPDU retransmits, by using the HARQ mechanism, data that is not correctly received. In another aspect, the first indication information is further used to indicate the second communications apparatus to feed back, in a BAR-BA feedback manner, a receiving status of a PPDU (namely, the second PPDU) in which the retransmitted data is located.

The BAR-BA manner means that after the second communications apparatus receives a BAR from the first communications apparatus, the second communications apparatus sends a BA of the second PPDU to the first communications apparatus.

A receiving status of a PPDU, an MPDU, or retransmitted data described in this specification refers to whether the PPDU, the MPDU, or the retransmitted data is correctly received. In other words, the receiving status includes two possibilities: correctly received and not correctly received.

When the first communications apparatus receives the negative acknowledgment from the second communications apparatus, the first communications apparatus retransmits the data that is not correctly received by the second communications apparatus. As described above, the first MPDU in the first PPDU is not correctly received. Therefore, the first communications apparatus needs to retransmit data that is in the first MPDU and that is not correctly received.

Optionally, the first communications apparatus may retransmit only error data in the first MPDU, or the first communications apparatus may retransmit the first MPDU.

In operation 320, the first communications apparatus sends the second PPDU to the second communications apparatus. In other words, the first communications apparatus retransmits the data that is not correctly received.

The second communications apparatus receives the second PPDU from the first communications apparatus.

330: The first communications apparatus sends a feedback request to the second communications apparatus, where the feedback request is used to request the second communications apparatus to send feedback information of the second PPDU.

The feedback information of the second PPDU is used to indicate whether the second PPDU is correctly received by the second communications apparatus.

The second communications apparatus receives the feedback request from the first communications apparatus.

340: The second communications apparatus sends feedback information of the second PPDU to the first communications apparatus based on a receiving status of the second PPDU.

It may be seen that, in the feedback mechanism shown in FIG. 3, after receiving the second PPDU that is retransmitted by the first communications apparatus by using the HARQ, the second communications apparatus does not immediately provide a feedback to the first communications apparatus, but sends the feedback information of the second PPDU to the first communications apparatus after receiving the feedback request from the first communications apparatus.

In other words, in the method shown in FIG. 3, when the first communications apparatus determines to use the HARQ to retransmit data that is not correctly received, the first communications apparatus and the second communications apparatus feed back the receiving status of the second PPDU in the BAR-BA manner.

After retransmitting, by using the HARQ, the data that is not correctly received by the second communications apparatus, the first communications apparatus needs to send a BAR to the second communications apparatus. Then, the second communications apparatus sends, to the first communications apparatus, a feedback indicating whether the second PPDU in which the retransmitted data is located is correctly received. However, in the conventional HARQ mechanism, the second communications apparatus autonomously sends a feedback to the first communications apparatus after receiving the retransmitted data from the first communications apparatus and performing a block acknowledgment operation. In the technical solutions in this application, after the second communications apparatus receives the retransmitted data, time for determining whether the second PPDU in which the retransmitted data is located is correctly received is prolonged. In this way, more time is left for the second communications apparatus to perform an acknowledgment operation, so that the feedback information from the second communications apparatus may be within the SIFS.

Figure 4:
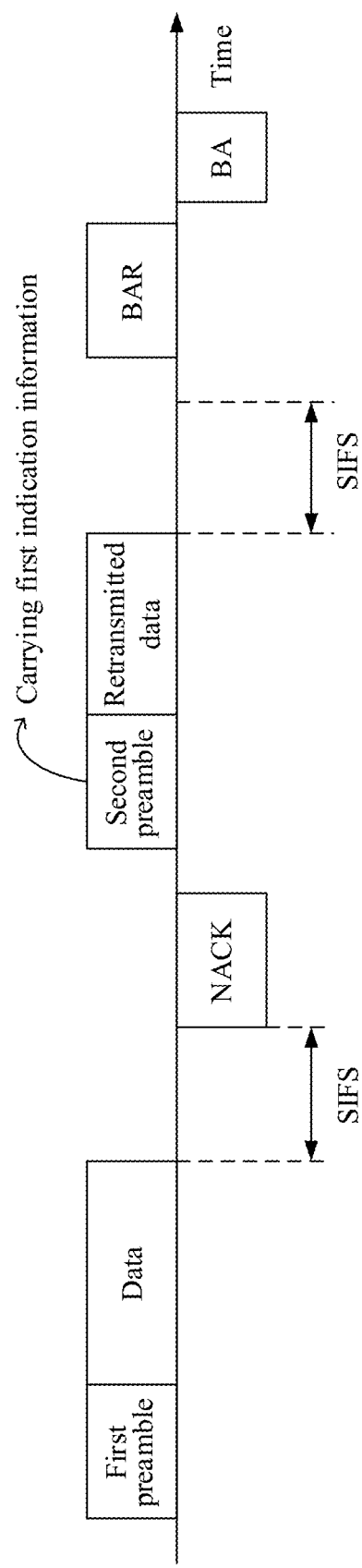
FIG. 4 is an example of sending feedback information according to this application.
Figure 5:
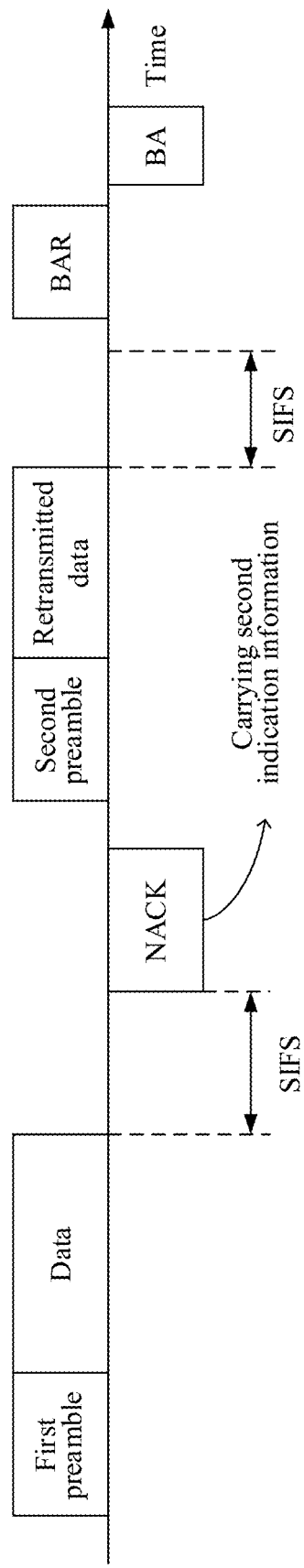
FIG. 5 is another example of sending feedback information according to this application.

The following gives two examples of the method 300 with reference to FIG. 4 and FIG. 5.

FIG. 4 is an example of sending feedback information according to this application.

As shown in FIG. 4, a first communications apparatus sends a first PPDU to a second communications apparatus, where the first PPDU includes a first preamble and one or more MPDUs. If the second communications apparatus does not correctly receive a first MPDU in the first PPDU, the second communications apparatus sends a NACK to the first communications apparatus, to indicate that the first MPDU is not correctly received. The first communications apparatus receives the NACK from the second communications apparatus, and learns that the first MPDU is not correctly received, so that data that is in the first MPDU and that is not correctly received needs to be retransmitted.

The first communications apparatus sends a second PPDU to the second communications apparatus, where the second PPDU is used to retransmit the data that is in the first MPDU and that is not correctly received. In embodiments, if the first communications apparatus determines to use HARQ for retransmission, the second PPDU carries first indication information, the first indication information is used to indicate that the second PPDU uses the HARQ, and whether the second PPDU is correctly received is fed back in a BAR-BA feedback manner.

Optionally, in an embodiment, a preamble in the second PPDU carries the first indication information.

The second communications apparatus receives the second PPDU from the first communications apparatus, and obtains the first indication information from the preamble in the second PPDU.

The first communications apparatus sends a BAR to the second communications apparatus, where the BAR is used to request the second communications apparatus to send feedback information of the second PPDU to the first communications apparatus.

After receiving the BAR from the first communications apparatus, the second communications apparatus sends the feedback information (namely, a BA) of the second PPDU to the first communications apparatus. The feedback information is used to indicate whether the second PPDU is correctly received.

It should be noted that, the first PPDU and the second PPDU in FIG. 4 are merely used to distinguish PPDUs in two transmission processes, and no other limitation is imposed on the PPDU. In addition, a first preamble and a second preamble are respectively used to represent preambles included in the two PPDUs, and no other limitation is imposed on the preamble. For example, the first preamble and the second preamble may be the same or different, which is not limited herein.

In the solution in FIG. 4, the first communications apparatus (namely, a transmit end of data) determines whether to use the HARQ to feed back a receiving status of the retransmitted data. When determining to use the HARQ mechanism for feedback, the first communications apparatus notifies a receive end to perform the feedback in the BAR-BA manner. In other words, as described above, the HARQ and the BAR-BA feedback manner are bound for retransmission.

Optionally, in another example, the second communications apparatus (namely, a receive end of data) may also determine whether the HARQ mechanism is used for retransmission. When determining to use the HARQ, the second communications apparatus notifies the first communications apparatus. In addition, the BAR-BA feedback manner is used to feed back a receiving status of the second PPDU in which the retransmitted data is located. The following describes the feedback with reference to FIG. 5.

FIG. 5 is another example of sending feedback information according to this application. As shown in FIG. 5, a first communications apparatus sends a first PPDU to a second communications apparatus, where the first PPDU includes one or more MPDUs. The second communications apparatus receives the first PPDU from the first communications apparatus, and feeds back an ACK or a NACK to the first communications apparatus based on a receiving status of the first PPDU. This specification mainly describes a case in which the second communications apparatus feeds back a NACK.

If a first MPDU included in the first PPDU is not correctly received, the second communications apparatus sends a negative acknowledgment, namely, a NACK, to the first communications apparatus. The negative acknowledgment carries second indication information, and the second indication information is used to indicate to use HARQ to retransmit data that is in the first MPDU and that is not correctly received. In addition, the second indication information is further used to indicate the second communications apparatus to send, to the first communications apparatus after receiving a BAR sent by the first communications apparatus, a BA of a second PPDU in which the retransmitted data is located.

After receiving the NACK, the first communications apparatus may learn, based on the second indication information carried in the NACK, that the HARQ is used to retransmit the data that is not correctly received, and whether the second PPDU in which the retransmitted data is located is correctly received needs to be fed back in a BAR-BA manner.

The first communications apparatus sends the second PPDU to the second communications apparatus, where the second PPDU uses the HARQ.

The first communications apparatus sends the BAR to the second communications apparatus, where the BAR is used to request the second communications apparatus to send feedback information about a receiving status of the second PPDU to the first communications apparatus.

After receiving the BAR from the first communications apparatus, the second communications apparatus sends the feedback information of the second PPDU to the first communications apparatus.

It should be noted that, in the examples in FIG. 4 and FIG. 5, a factor based on which the first communications apparatus and the second communications apparatus decide to perform retransmission by using the HARQ is not concerned in this application, and a conventional method may be used.

Optionally, the PPDU mentioned in this specification may be a HE SU PPDU, or may be a HE MU PPDU.

In some examples, the second PPDU sent by the first communications apparatus to the second communications apparatus is an HE SU PPDU. In this case, first indication information may be carried in an HE-SIG-A2 field in a preamble in the HE SU PPDU. For example, B14 in the HE-SIG-A2 field is a reserved bit and may be used to carry the first indication information. For example, when B14 in the HE-SIG-A2 field is "1", the HARQ is used for retransmission, and the BAR-BA is used for a feedback on the receiving status of the MPDU to which the retransmitted data belongs. When B14 in the HE-SIG-A2 field is "0", a conventional transmission mechanism is used.

It should be understood that the conventional transmission mechanism mentioned herein and below refers to retransmission by using an automatic repeat request (ARQ), and a feedback mechanism is specified according to an ARQ policy.

Optionally, in some other examples, the first communications apparatus sends a second HE MU PPDU to the second communications apparatus. In this case, the first indication information may be carried in an HE-SIG-A2 field in a preamble in the HE MU PPDU. For example, B7 in the HE-SIG-A2 field is a reserved bit and may be used to carry the first indication information. For example, when B7 in the HE-SIG-A2 field is "1", the HARQ is used for retransmission, and the BAR-BA is used for a feedback on the receiving status of the MPDU to which the retransmitted data belongs. Otherwise, when B7 in the HE-SIG-A2 field is "0", the conventional transmission mechanism is used.

Optionally, the first indication information may be represented as a HARQ indication. If the HARQ indication carried in the second PPDU is set to "1" by the first communications apparatus, the HARQ mechanism is used for data retransmission, and the BAR-BA manner is used by default. Otherwise, the conventional transmission mechanism is used.

In the foregoing examples in FIG. 4 and FIG. 5, the first communications apparatus retransmits, by using the HARQ, the data that is not correctly received, and feeds back, by using the BAR-BA manner, the receiving status of the first MPDU to which the retransmitted data belongs. In this way, the BA sent by the second communications apparatus for the receiving status of the retransmitted data may be within the SIFS.

Figure 6:
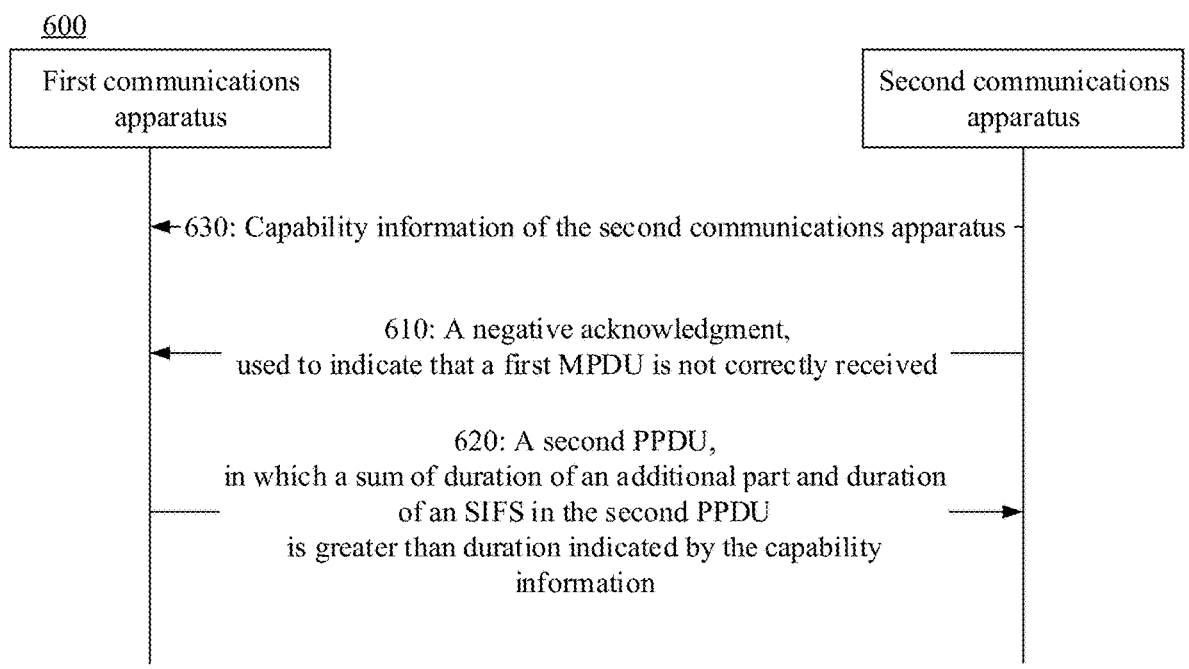
FIG. 6 is a schematic diagram of another feedback information sending method according to this application.

With reference to FIG. 6, the following provides another feedback information sending method 600, which may also ensure that a BA sent by a second communications apparatus is within an SIFS.

FIG. 6 is a schematic diagram of another feedback information sending method according to this application.

610: A first communications apparatus receives a negative acknowledgment from the second communications apparatus.

The negative acknowledgment is used to indicate that a first MPDU included in a first PPDU sent by the first communications apparatus to the second communications apparatus is not correctly received.

For description of operation 610, refer to the description of operation 310. Details are not described herein again.

620: The first communications apparatus sends a second PPDU to the second communications apparatus based on capability information of the second communications apparatus, where the second PPDU includes a second MPDU and an additional part.

The capability information is used to indicate duration required by the second communications apparatus to feed back to the first communications apparatus whether an MPDU to which retransmitted data belongs is correctly received. A sum of duration of the additional part and the SIFS is greater than the duration indicated by the capability information.

Alternatively, the capability information is used to indicate duration required by the second communications apparatus to feed back to the first communications apparatus whether a PPDU in which the retransmitted data is located is correctly received. The PPDU in which the retransmitted data is located is referred to as the second PPDU in this specification.

It should be understood that the second PPDU is used to retransmit data that is in the first MPDU and that is not correctly received.

In the technical solution in FIG. 6, the first communications apparatus may learn about, based on the capability information of the second communications apparatus, the duration required by the second communications apparatus to feed back to the first communications apparatus whether the MPDU to which the retransmitted data belongs is correctly received. Therefore, based on the duration indicated by the capability information of the second communications apparatus, the first communications apparatus adds the additional part after the second MPDU included in the second PPDU, so that a sum of the duration of the additional part and the duration of the SIFS is greater than a delay indicated by the capability information. In other words, a sum of the duration of the additional part and the duration of the SIFS is greater than the duration required by the second communications apparatus to feed back whether the MPDU to which the retransmitted data belongs is correctly received. Therefore, it can be ensured that a BA fed back by the second communications apparatus is within the SIFS.

Optionally, before sending data to the second communications apparatus, the first communications apparatus may obtain the capability information of the second communications apparatus, as shown in operation 630.

630: The first communications apparatus obtains the capability information of the second communications apparatus.

In operation 630, the first communications apparatus may obtain the capability information of the second communications apparatus in a plurality of embodiments.

For example, after the first communications apparatus establishes a connection to the second communications apparatus, the second communications apparatus estimates the duration required by the second communications apparatus to feed back whether the MPDU to which the retransmitted data belongs is correctly received, and sends an estimation result to the first communications apparatus.

For another example, if the second communications apparatus does not correctly receive the first MPDU, the second communications apparatus may alternatively add the capability information of the second communications apparatus to a negative acknowledgment and send the negative acknowledgment to the first communications apparatus. Further, the first communications apparatus determines, based on the capability information of the second communications apparatus, duration of the retransmitted second PPDU. A manner in which the first communications apparatus obtains the capability information of the second communications apparatus is not limited herein.

In addition, operation 630 is shown by dashed lines in FIG. 6, indicating that operation 630 is not mandatory for one data transmission. For example, the first communications apparatus may obtain the capability information of the second communications apparatus in advance and store the capability information. During a subsequent data retransmission, the stored capability information of the second communications apparatus may be directly referred, and reporting by the second communications apparatus is not required.

Optionally, the capability information of the second communications apparatus may include a plurality of specific embodiments.

In an example, the capability information may be used to indicate a delay for the second communications apparatus to feed back to the first communications apparatus whether the MPDU to which the retransmitted data belongs is correctly received.

In another example, the capability information may be used to indicate maximum duration that is of the PPDU in which the retransmitted data is located and that is acceptable to the second communications apparatus, and/or a maximum quantity of MPDUs that are in the PPDU in which the retransmitted data is located and that are associated with data that is not correctly received.

It should be understood that an operation that the second communications apparatus feeds back whether the MPDU to which the retransmitted data belongs is correctly received is referred to as the block acknowledgment operation described above. Therefore, the capability information of the second communications apparatus may reflect a delay for the second communications apparatus to perform the block acknowledgment operation.

Alternatively, the duration required by the second communications apparatus to feed back to the first communications apparatus whether the MPDU to which the retransmitted data belongs is correctly received is also referred to as a BA delay, namely, a block acknowledgment delay.

In an embodiment, the BA delay may be carried in a MAC capabilities information field.

Optionally, the MAC capabilities information field may directly carry a value of the BA delay.

For example, after obtaining the BA delay of the second communications apparatus through estimation, the second communications apparatus may add a subfield shown in Table 1 to the MAC capabilities information field.

TABLE 1

| Subfield | Definition | Code |
| --- | --- | --- |
| BA delay | Duration that is estimated by a receive end and that is required for feeding back whether an MPDU to which retransmitted data belongs is correctly received | Be set to estimated maximum duration required for generating feedback information of a retransmitted data packet |

Optionally, BA delays may be classified into different levels based on duration in advance, and each level corresponds to one identifier, which is referred to as a level identifier hereinafter. The MAC capabilities information field may carry a level identifier.

The first communications apparatus may learn about, based on a level identifier in the MAC capabilities information field of the second communications apparatus, a BA delay corresponding to the level identifier.

For example, the BA delays are classified into level 1, level 2, and level 3. Level 1 is higher than level 2, and level 2 is higher than level 3. The higher the level, the longer the BA delay.

After obtaining the BA delay of the second communications apparatus through estimation, the second communications apparatus determines, based on level classification, a level to which the BA delay of the second communications apparatus belongs, and adds an identifier of the level to which the BA delay of the second communications apparatus belongs to the MAC capabilities information field, as shown in Table 2.

TABLE 2

| Subfield | Definition | Code |
| --- | --- | --- |
| Level to which a BA delay belongs | Level to which duration that is estimated by a receive end and that is required for replying whether an MPDU to which retransmitted data belongs is correctly received belongs | Be set to a level to which estimated maximum duration required for generating feedback information of a retransmitted data packet belongs |

For example, a level to which a BA delay belongs is level 1 and a code is 1, a range of the BA delay is [a, b]. A level to which a BA delay belongs is level 2 and a code is 2, a range of the BA delay is [b, c]. A level to which a BA delay belongs is level 3 and a code is 3, a range of the BA delay is [c, d], and so on. A quantity of specified levels and a length of a range of a BA delay corresponding to each level are not limited in this application. a, b, and c all indicate lengths of the BA delays.

In the solution in FIG. 6, the additional part may include a plurality of specific embodiments. For example, an additional part sent by the first communications apparatus to the second communications apparatus may be padding of the second MPDU, as shown in FIG. 7.

Figure 7:
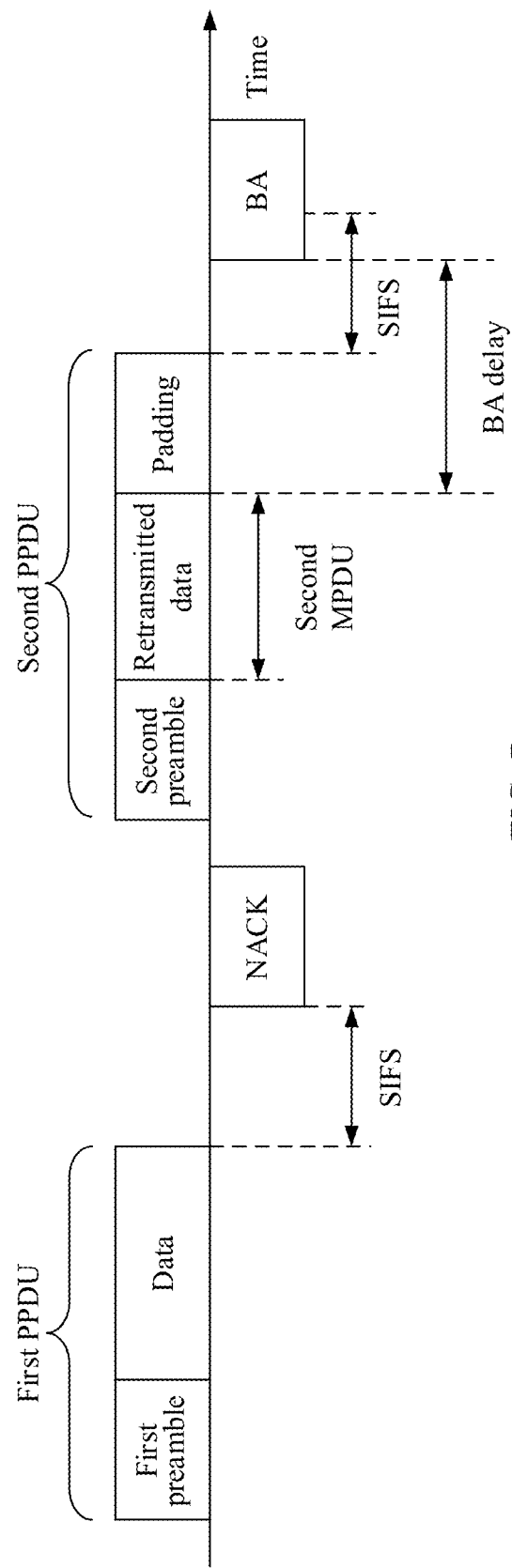
FIG. 7 is an example of sending feedback information according to this application.

FIG. 7 is an example of sending feedback information according to this application. As shown in FIG. 7, when a first communications apparatus needs to retransmit data after receiving a NACK from a second communications apparatus, if the first communications apparatus determines, based on capability information of the second communications apparatus, that an SIFS and a BA delay of the second communications apparatus that is indicated by the capability information meet a condition, that is, BA delay>SIFS, the first communications apparatus pads a retransmitted data packet (namely, a second PPDU), so that a sum of a length of the padding part and duration of the SIFS is greater than the BA delay.

In another embodiment, the additional part sent by the first communications apparatus to the second communications apparatus may alternatively be newly transmitted data. A length of the newly transmitted data also meets the foregoing limitation on the duration of the padding part. To be specific, a sum of duration of the newly transmitted data and the duration of the SIFS is greater than the BA delay, as shown in FIG. 8.

Figure 8:
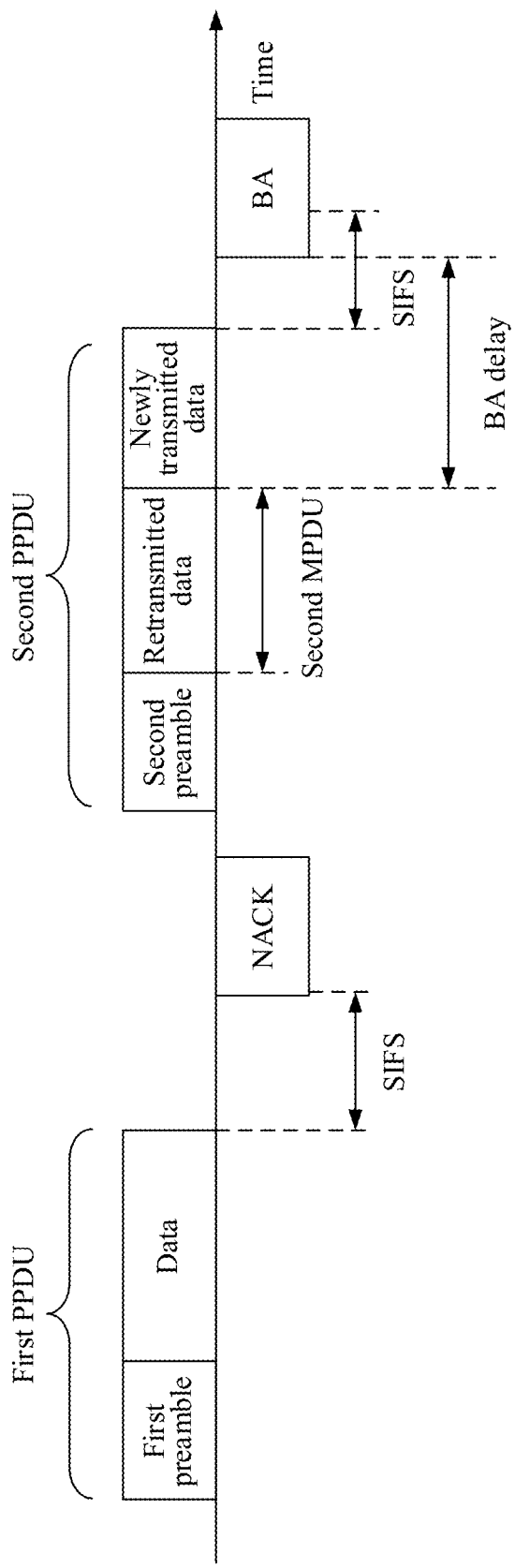
FIG. 8 is another example of sending feedback information according to this application.

FIG. 8 is another example of sending feedback information according to this application. As shown in FIG. 8, when a first communications apparatus needs to retransmit data after receiving a NACK from a second communications apparatus, if the first communications apparatus determines that a BA delay of the second communications apparatus is greater than an SIFS, the first communications apparatus aggregates the newly transmitted data after the retransmitted data, so that a sum of the length of the newly transmitted data and the duration of the SIFS is greater than the BA delay.

As described above, the capability information obtained by the first communications apparatus from the second communications apparatus may alternatively be used to indicate maximum duration that is of a PPDU in which the retransmitted data is located and that is acceptable to the second communications apparatus and/or a maximum quantity of MPDUs to which the retransmitted data belongs.

In other words, the PPDU in which the retransmitted data is located is referred to as the second PPDU in this specification, and the MPDU to which the retransmitted data belongs is referred to as an MPDU that is in the second PPDU and that is associated with the data that is not correctly received.

It may be understood that the maximum duration of the second PPDU acceptable to the second communications apparatus or the maximum quantity of MPDUs to which the retransmitted data belongs may reflect the BA delay of the second communications apparatus. Therefore, the second communications apparatus estimates the maximum duration of the second PPDU and/or the maximum quantity of MPDUs to which the retransmitted data belongs, and sends an estimation result to the first communications apparatus, so that the first communications apparatus can indirectly learn about the BA delay of the second communications apparatus.

Optionally, the second communications apparatus may add a subfield shown in Table 3 to the MAC capabilities information field.

TABLE 3

| Subfield | Definition | Code |
| --- | --- | --- |
| Duration of a PPDU in which retransmitted data is located | Duration that is of a PPDU in which retransmitted data is located and that is acceptable to a receive end | Be set to estimated maximum duration of a PPDU in which retransmitted data is located |
| Quantity of MPDUs to which retransmitted data belongs | Quantity that is of MPDUs to which retransmitted data belongs and that is acceptable to a receive end | Be set to an estimated maximum quantity of MPDUs to which retransmitted data belongs |
| Quantity of MPDUs to which newly transmitted data in a PPDU in which retransmitted data is located belongs | Quantity that is of MPDUs to which newly transmitted data in a PPDU in which retransmitted data is located belongs and that is acceptable to a receive end | Be set to an estimated maximum quantity of MPDUs to which newly transmitted data in a PPDU in which retransmitted data is located belongs |

The foregoing describes in detail a scenario in which a single-link connection is used between the first communications apparatus and the second communications apparatus. The following describes a multi-link connection scenario.

Scenario 2

A first communications apparatus and a second communications apparatus are connected by using a plurality of links.

Figure 9:
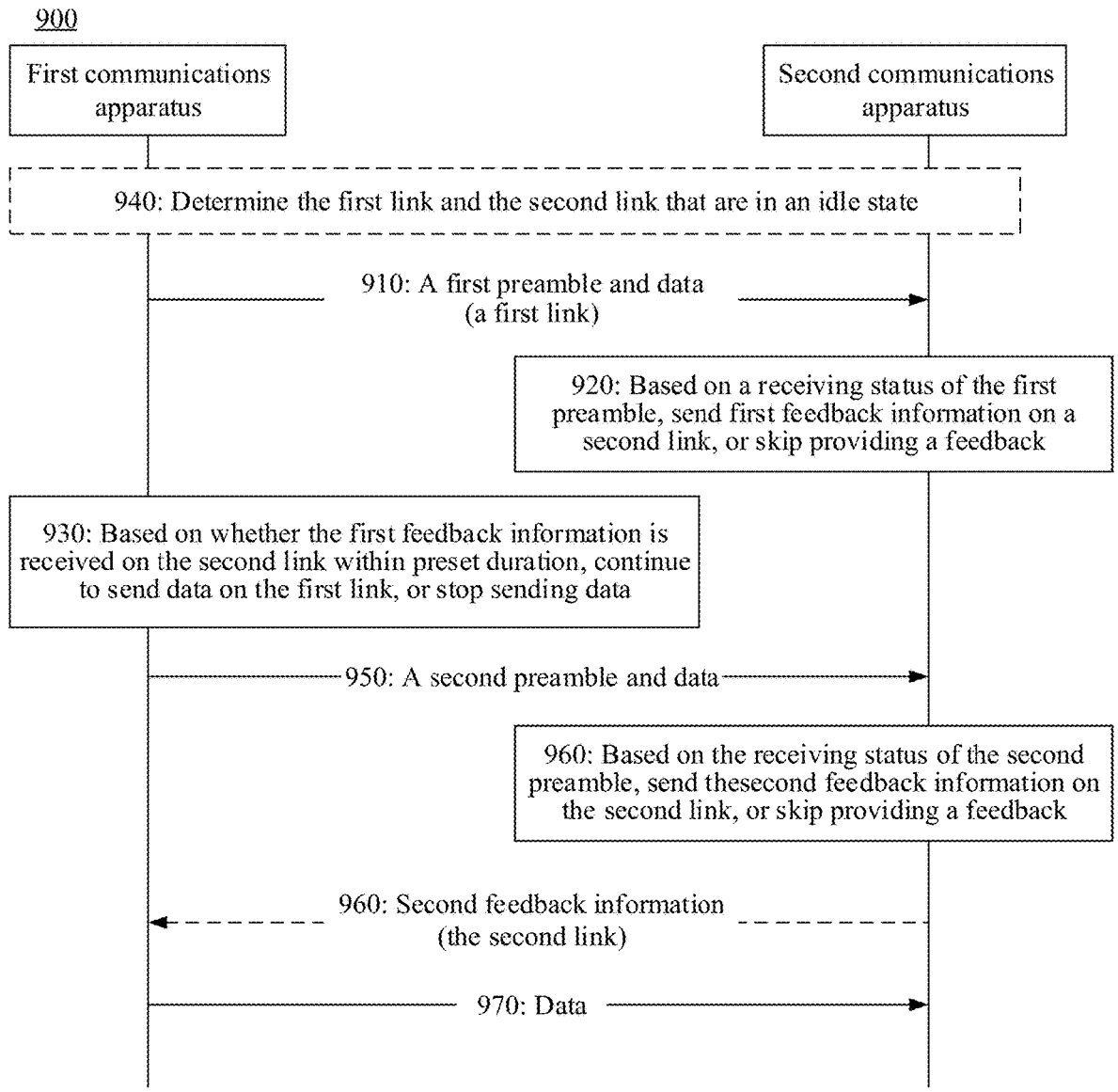
FIG. 9 is a schematic diagram of yet another feedback information sending method according to this application.

FIG. 9 is a schematic diagram of yet another feedback information sending method according to this application.

910: A first communications apparatus sends a first preamble to a second communications apparatus on a first link, and sends data to the second communications apparatus starting from a moment when the first preamble ends.

The second communications apparatus receives the first preamble on the first link, and receives data on the first link starting from the moment when the first preamble ends.

920: After receiving the first preamble, the second communications apparatus performs one of the following actions based on whether the first preamble is correctly received (or whether the first preamble is correctly decoded):

if the second communications apparatus correctly receives the first preamble, the second communications apparatus sends first feedback information to the first communications apparatus on a second link, where the first feedback information is used to indicate that the second communications apparatus correctly receives the first preamble; or if the second communications apparatus does not correctly receive the first preamble, the second communications apparatus does not provide a feedback to the first communications apparatus. In other words, the second communications apparatus chooses not to send any information when the first preamble is not correctly received.

930: The first communications apparatus performs one of the following actions within preset duration based on whether the first feedback information is received on the second link:

if the first communications apparatus receives the first feedback information within the preset duration, the first communications apparatus continues to send data on the first link; or if the first communications apparatus does not receive the first feedback information within the preset duration, the first communications apparatus stops sending data to the second communications apparatus.

For the first communications apparatus, after the first communications apparatus sends the first preamble, if the first feedback information is not received on the second link within the preset duration, the first communications apparatus determines that the retransmission fails and continues to perform a retransmission.

Optionally, the "preset duration" described in operation 930 may be implemented in a plurality of manners.

For example, the preset duration may be set by using a timer.

In embodiments, the first communications apparatus may start the timer after sending the first preamble. The timer is configured to set duration for the first communications apparatus to receive the first feedback information from the second communications apparatus. The first feedback information is used to indicate that the second communications apparatus correctly receives the first preamble.

Alternatively, the duration set by the timer may also be expressed as timeout time of the timer.

Optionally, a start moment of the timer may be set by the first communications apparatus. For example, the start moment of the timer may coincide with a moment when the first preamble starts, or the start moment of the timer may coincide with the moment when the first preamble ends. Alternatively, the start moment of the timer may be within duration corresponding to the first preamble. This is not limited herein.

In the technical solution in FIG. 9, considering that in the HARQ mechanism, a preamble and a data part are separately encoded. Therefore, this application proposes that a receiving status of a preamble may be fed back in advance. In other words, after receiving the preamble, the second communications apparatus does not need to wait for completion of receiving all the data, and may feed back whether the preamble is correctly received, which can save time.

It should be noted that the first link and the second link may be any two of available links in an idle state between the first communications apparatus and the second communications apparatus.

In some embodiments, before sending the first preamble to the second communications apparatus, the first communications apparatus may determine two links in an idle state as the first link and the second link. Therefore, before operation 910, operation 940 may be further included.

940: The first communications apparatus determines the first link and the second link that are in an idle state.

Alternatively, the first communications apparatus determines that the first link and the second link are in an idle state, or it may be said that the first communications apparatus obtains a transmit opportunity (TXOP) of the first link and the second link.

In one embodiment, after obtaining the TXOP of the first link, the first communications apparatus may send a detection signal to the first communications apparatus on the first link. If the first communications apparatus receives a response signal of the second communications apparatus on the second link, the TXOP of the second link is obtained.

A transmit opportunity of a link can be characterized by duration. For example, if the first communications apparatus obtains a transmit opportunity of a link in a period of time, the first communications apparatus may use the link in the period of time.

This specification mainly relates to a case in which the second communications apparatus does not correctly receive the first preamble. When the timer expires, if the first communications apparatus does not receive a feedback from the second communications apparatus on the second link, a retransmission is performed.

Therefore, after operation 940, operations 950-980 may be included.

950: The first communications apparatus sends a second preamble to the second communications apparatus on the first link, and retransmits the data starting from a moment when the second preamble ends.

960: The second communications apparatus performs one of the following actions based on whether the second preamble is correctly received:

if the second communications apparatus correctly receives the second preamble, the second communications apparatus sends second feedback information to the first communications apparatus on the second link, where the second feedback information is used to indicate that the second communications apparatus correctly receives the second preamble; or if the second communications apparatus does not correctly receive the second preamble, the second communications apparatus does not provide a feedback to the first communications apparatus on the second link. In other words, the second communications apparatus chooses not to send any information when the second preamble is not correctly received.

Operation 960 shown by dashed lines in FIG. 9 indicates the former case of operation 960. To be specific, the second communications apparatus correctly receives the second preamble and therefore the second communications apparatus sends the second feedback information to the first communications apparatus on the second link, to indicate that the second preamble is correctly received.

For the first communications apparatus, if the second feedback information is received on the second link within the timeout time of the timer, the first communications apparatus continues to send data to the second communications apparatus, as shown in operation 970.

970: The first communications apparatus continues to send data to the second communications apparatus.

The data in operation 970 may be the retransmitted data. If the TXOP of the first link has not ended after sending of the retransmitted data is complete, the first communications apparatus may further continue to send the newly transmitted data.

Optionally, if no information is received on the second link within the timeout time of the timer, the first communications apparatus enters a next retransmission.

It can be seen that, in the technical solution in FIG. 9, the second communications apparatus separately feeds back a receiving status of the preamble and a receiving status of the data. In this way, when the preamble is received incorrectly, the first communications apparatus stops sending subsequent data in time, to avoid a waste of time resources and enter a retransmission. When the second communications apparatus correctly receives the preamble, the second communications apparatus provides a feedback to the first communications apparatus within the duration set by the timer, so that the first communications apparatus continues to send data.

In this embodiment, the first communications apparatus may include an indication field in the sent first preamble, where the indication field is used to indicate the second communications apparatus to feed back a receiving status of the first preamble after receiving the first preamble. In other words, the indication field is used to enable an advance feedback of the first preamble, so that the second communications apparatus does not need to feed back the receiving status of the first preamble and the PPDU to which the data belongs only after receiving the first preamble and the data.

For example, the indication field of the first preamble may be preambleack, and when the preambleack is set to "1", the second communications apparatus needs to feed back the receiving status of the preamble in advance. When the preambleack is set to "0", the second communications apparatus uses the conventional HARQ mechanism. To be specific, after receiving the preamble and the data, the second communications apparatus feeds back the receiving status of the preamble and the PPDU to which the data belongs.

For ease of description, the duration of the timer is set to preambleacktimeout in the following. The preambleacktimeout needs to meet a condition: preambleacktimeout≤EIFS.

Herein, EIFS represents extended inter-frame space (extended inter-frame space).

By using this solution, a gain in time that can be obtained may be expressed as the following formula (1):

$$\text{Gain}=\text{payloadTxTime}+\text{aSIFSTime}+\text{ACKTxTime}-\text{PreambleAckTimeOut}\geq\text{PayloadTxTime}+\text{aSIFSTime}+\text{ACKTxTime}-(\text{aSIFSTime}+\text{ACKTxTime}+\text{DIFS})=\text{PayloadTxTime}-\text{DIFS} \quad (1)$$

DIFS represents distributed inter-frame spacing.

Figure 10:
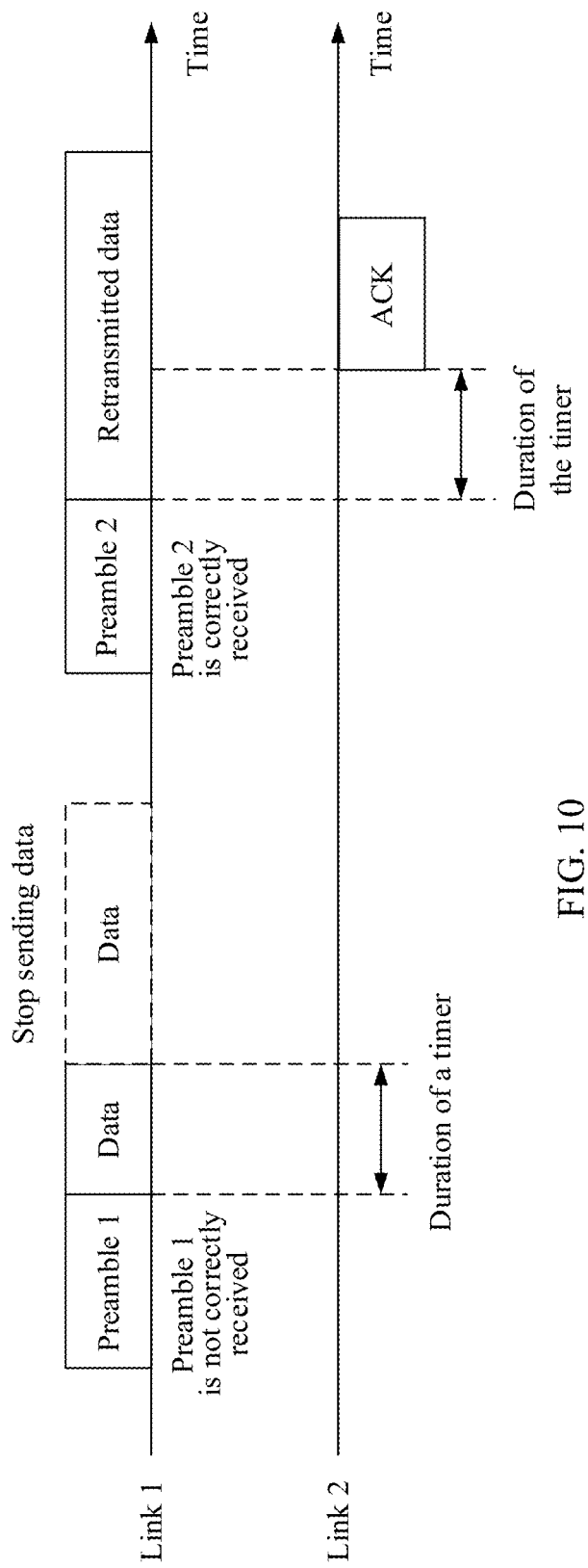
FIG. 10 is an example of sending feedback information according to this application.

FIG. 10 is an example of sending feedback information according to this application. As shown in FIG. 10, after a first communications apparatus obtains TXOPs of link 1 and link 2, the first communications apparatus sends preamble 1 and data on link 1, where preamble 1 carries the indication field. If the second communications apparatus does not correctly receive preamble 1, the second communications apparatus does not provide a feedback to the first communications apparatus. The first communications apparatus cannot receive the feedback on the second link within the timeout time of the timer, so that the first communications apparatus determines that data transmission fails, stops data transmission, and performs a retransmission.

When the TXOPs of link 1 and link 2 have not ended, the first communications apparatus sends preamble 2 and retransmits data on link 1. If the second communications apparatus correctly receives preamble 2 on link 1, the second communications apparatus sends an ACK to the first communications apparatus on link 2, to indicate to the first communications apparatus that preamble 2 is correctly received. At the same time, the second communications apparatus continues to receive, on link 1, data sent by the first communications apparatus. After receiving the ACK, the first communications apparatus continues to send the retransmitted data on link 1. If sending of the retransmitted data is complete, the first communications apparatus may continue to send newly transmitted data.

In another case, if the second communications apparatus correctly receives preamble 2 on link 1, the second communications apparatus sends an ACK to the first communications apparatus on link 2, and the first communications apparatus receives the ACK, the first communications apparatus continues to send data to the second communications apparatus on link 1, and no retransmission is required.

It can be seen that, by separately feeding back the receiving status of the preamble in advance, data sending can be stopped in time when the preamble is incorrectly received, thereby avoiding a waste of time, and reducing a waste of data transmission resources.

The feedback information sending method provided in this application is described in detail above. The following describes a communications apparatus provided in this application.

Figure 11:
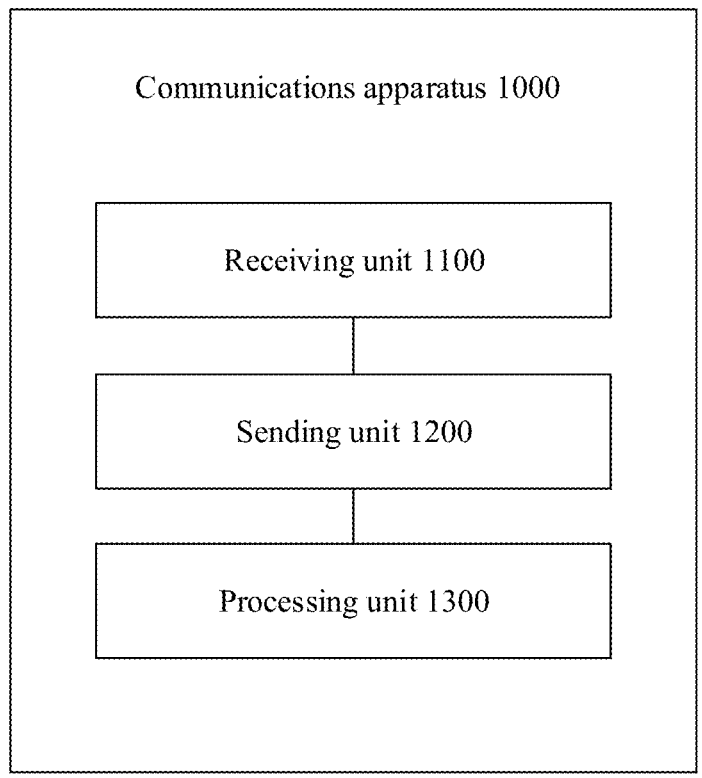
FIG. 11 is a schematic block diagram of a communications apparatus 1000 according to this application.

FIG. 11 is a schematic block diagram of a communications apparatus 1000 according to this application. As shown in FIG. 11, the communications apparatus 1000 includes a receiving unit 1100 and a sending unit 1200.

In one embodiment, the communications apparatus 1000 may correspond to the first communications apparatus in the method 300 and the process shown in FIG. 4. In this case, functions of each unit of the communications apparatus 1000 are described as follows.

The receiving unit 1100 is configured to receive a negative acknowledgment from a second communications apparatus. The negative acknowledgment is used to indicate that a first MPDU included in a first PPDU sent by the communications apparatus to the second communications apparatus is not correctly received.

The sending unit 1200 is configured to send a second PPDU to the second communications apparatus. A preamble in the second PPDU carries first indication information. The first indication information is used to indicate the second PPDU to retransmit, by using hybrid automatic repeat request HARQ, data that is in the first MPDU and that is not correctly received, and is further used to indicate the second communications apparatus to send feedback information of the second PPDU to the first communications apparatus after receiving a feedback request from the first communications apparatus. The feedback information of the second PPDU is used to indicate whether the second PPDU is correctly received.

The sending unit 1200 is further configured to send the feedback request to the second communications apparatus.

The receiving unit 1100 is further configured to receive the feedback information of the second PPDU from the second communications apparatus.

Optionally, the receiving unit 1100 and the sending unit 1200 may alternatively be physically integrated into one transceiver unit.

Optionally, in an embodiment, the second PPDU is a high efficiency single user HE SU PPDU, and a signaling field A in the HE SU PPDU carries the first indication information; or the second PPDU is a high efficiency multiple user HE MU PPDU, and a signaling field A in the HE MU PPDU carries the first indication information.

In another embodiment, the communications apparatus 1000 may correspond to the first communications apparatus in the process shown in FIG. 5. In this case, functions of each unit of the communications apparatus 1000 are described as follows.

The receiving unit 1100 receives a negative acknowledgment from the second communications apparatus. The negative acknowledgment is used to indicate that a first MPDU included in a first PPDU sent by the first communications apparatus to the second communications apparatus is not correctly received. The negative acknowledgment carries second indication information. The second indication information is used to indicate to retransmit, by using HARQ, data that is in the first MPDU and that is not correctly received, and is further used to indicate the second communications apparatus to send, to the first communications apparatus after receiving a feedback request from the first communications apparatus, feedback information of a PPDU in which the retransmitted data is located.

The sending unit 1200 sends a second PPDU to the second communications apparatus. The second PPDU retransmits, by using the HARQ, the data that is in the first MPDU and that is not correctly received.

The sending unit 1200 is further configured to send the feedback request to the second communications apparatus.

The receiving unit 1100 is further configured to receive the feedback information of the second PPDU from the second communications apparatus.

It should be understood that the PPDU in which the retransmitted data is located is referred to as the second PPDU in this specification.

In another embodiment, the communications apparatus 1000 may correspond to the first communications apparatus in the method 600. In this case, the communications apparatus 1000 may further include a processing unit 1300, and functions of each unit are described as follows.

The receiving unit 1100 is configured to receive a negative acknowledgment from the second communications apparatus. The negative acknowledgment is used to indicate that a first MPDU included in a first PPDU sent by the first communications apparatus to the second communications apparatus is not correctly received.

The processing unit 1300 is configured to control, based on capability information of the second communications apparatus, the sending unit 1200 to send a second PPDU to the second communications apparatus. The capability information is used to indicate duration required by the second communications apparatus to feed back to the first communications apparatus whether an MPDU to which retransmitted data belongs is correctly received. The second PPDU includes a second MPDU and an additional part, and the second PPDU retransmits, by using HARQ, data that is in the first MPDU and that is not correctly received. A sum of duration of the additional part and a short inter-frame space SIFS is greater than the duration indicated by the capability information.

Optionally, in an embodiment, the receiving unit 1100 is further configured to receive the capability information from the second communications apparatus.

Optionally, in an embodiment, the additional part is padding of the second MPDU, or the additional part is newly transmitted data.

Optionally, in an embodiment, the capability information is used to indicate a delay for the second communications apparatus to feed back to the first communications apparatus whether the MPDU to which the retransmitted data belongs is correctly received.

Optionally, in an embodiment, the capability information is used to indicate maximum duration that is of a PPDU in which the retransmitted data is located and that is acceptable to the second communications apparatus, and/or a maximum quantity of MPDUs to which the retransmitted data belongs.

Optionally, in an embodiment, the processing unit 1300 is configured to: based on the capability information, and when the duration indicated by the capability information is longer than the SIFS, the processing unit 1300 adds the additional part after the second MPDU to generate the second PPDU.

Optionally, in an embodiment, that the capability information is used to indicate the duration required by the second communications apparatus to feed back to the first communications apparatus whether the MPDU to which the retransmitted data belongs is correctly received includes: The capability information carries a level identifier corresponding to the duration required by the second communications apparatus to feed back to the first communications apparatus whether the MPDU to which the retransmitted data belongs is correctly received, where different duration required by the second communications apparatus to feed back to the first communications apparatus whether the MPDU to which the retransmitted data belongs is correctly received corresponds to different level identifiers.

In yet another embodiment, the communications apparatus 1000 may correspond to the first communications apparatus in the method 900. In this case, functions of each unit of the communications apparatus 1000 are described as follows.

The sending unit 1200 is configured to send a first preamble to the second communications apparatus by using a first link, and send data to the second communications apparatus starting from a moment when the first preamble ends.

The processing unit 1300 is further configured to: when the receiving unit 1100 does not receive first feedback information on a second link within preset duration, control the sending unit 1200 to stop sending data to the second communications apparatus.

Optionally, in an embodiment, the first preamble includes an indication field, and the indication field is used to indicate the second communications apparatus to feed back whether the first preamble is correctly received after receiving the first preamble.

Optionally, in an embodiment, the sending unit 1200 is further configured to send a second preamble to the second communications apparatus, and retransmit the data starting from a moment when the second preamble ends.

The processing unit 1300 is further configured to: when the receiving unit 1100 receives second feedback information on the second link within the preset duration, control the sending unit 1200 to continue to send data to the second communications apparatus, where the second feedback information is used to indicate that the second communications apparatus correctly receives the second preamble.

Optionally, in an embodiment, the sending unit 1200 is further configured to send a detection signal to the second communications apparatus on the first link, and attempt to receive a response signal of the second communications apparatus on the second link.

The processing unit 1300 is further configured to: when the receiving unit 1100 receives the response signal from the second communications apparatus on the second link, determine that the first link and the second link are in an idle state.

Optionally, in an embodiment, the detection signal includes request to send RTS and/or clear to send CTS.

In an embodiment, the communications apparatus 1000 may be the transmit end device in the method embodiments of this application, or may be a combined device, a component, or the like that may have a function of the first communications apparatus in the transmit end device. In this embodiment, the receiving unit 1100 may be a receiver, and the sending unit 1200 may be a transmitter. The receiver and the transmitter may be integrated into a transceiver. The processing unit 1300 may be a processing apparatus.

In another embodiment, the communications apparatus 1000 may be a chip or an integrated circuit installed in the transmit end device. In this embodiment, the receiving unit 1100 and the sending unit 1200 may be communications interfaces. For example, the receiving unit 1100 may be an input interface or an input circuit. The sending unit 1200 may be an output interface or an output circuit. The processing unit 1300 may be a processing apparatus.

A function of the processing apparatus may be implemented by hardware, or may be implemented by hardware executing corresponding software.

For example, the processing apparatus may include one or more memories and one or more processors, where the one or more memories are configured to store a computer program, and the one or more processors read and execute the computer program stored in the one or more memories, so that the communications apparatus 1000 performs an operation and/or processing performed by the first communications apparatus in the method embodiments of this application.

Optionally, the processing apparatus may include only the processor, and the memory configured to store the computer program is located outside the processing apparatus. The processor is connected to the memory by using a circuit/wire to read and execute the computer program stored in the memory.

Optionally, the processing apparatus may alternatively be hardware such as a logic circuit or an integrated circuit.

Optionally, the receiving unit 1100 and the sending unit 1200 may be integrated into a radio frequency apparatus, and the processing unit 1300 may be a baseband apparatus, a system on chip (SoC), or the like.

Figure 12:
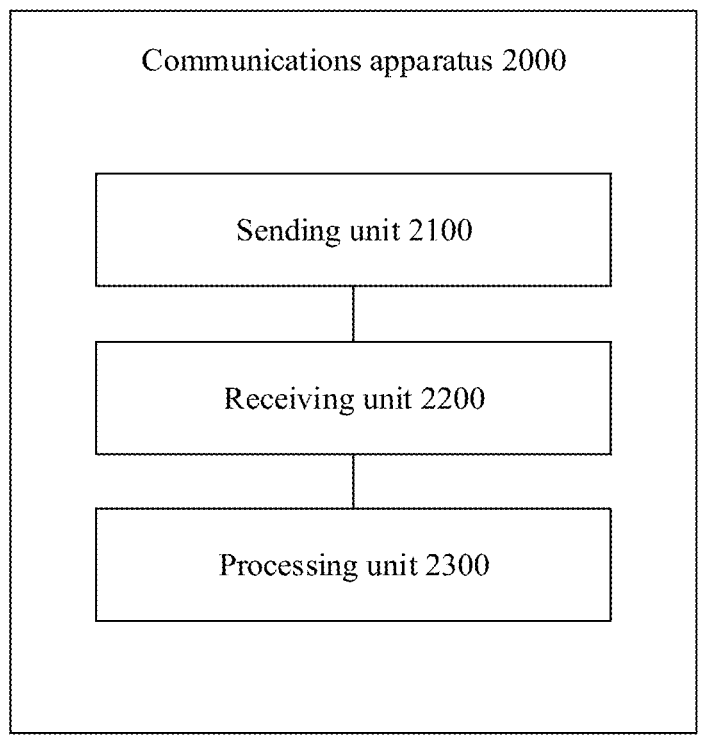
FIG. 12 is a schematic block diagram of a communications apparatus 2000 according to this application.

FIG. 12 is a schematic block diagram of a communications apparatus 2000 according to this application. As shown in FIG. 12, the communications apparatus 2000 includes a sending unit 2100 and a receiving unit 2200.

In one embodiment, the communications apparatus 2000 may correspond to the second communications apparatus in the method 300 and the process shown in FIG. 4. In this case, functions of each unit of the communications apparatus 2000 are described as follows.

The sending unit 2100 is configured to send a negative acknowledgment to a first communications apparatus. The negative acknowledgment is used to indicate that a first MPDU included in a first PPDU sent by the first communications apparatus to the communications apparatus is not correctly received.

The receiving unit 2200 is configured to receive a second PPDU from the first communications apparatus. A preamble in the second PPDU carries first indication information. The first indication information is used to indicate the second PPDU to retransmit, by using HARQ, data that is in the first MPDU and that is not correctly received, and is further used to indicate the second communications apparatus to send feedback information of the second PPDU to the first communications apparatus after receiving a feedback request from the first communications apparatus. The feedback information of the second PPDU is used to indicate whether the second PPDU is correctly received.

The receiving unit 2200 is further configured to receive the feedback request from the first communications apparatus.

The sending unit 2100 is further configured to send the feedback information of the second PPDU to the first communications apparatus.

Optionally, the sending unit 2100 and the receiving unit 2200 may alternatively be physically integrated into one transceiver unit.

Optionally, in an embodiment, the second PPDU is a HE SU PPDU, and a signaling field A in the HE SU PPDU carries the first indication information; or the second PPDU is a HE MU PPDU, and a signaling field A in the HE MU PPDU carries the first indication information.

In one embodiment, the communications apparatus 2000 may correspond to the second communications apparatus in FIG. 5. In this case, functions of each unit of the communications apparatus 2000 are described as follows.

The sending unit 2100 sends a negative acknowledgment to the first communications apparatus. The negative acknowledgment is used to indicate that a first MPDU included in a first PPDU sent by the first communications apparatus to the second communications apparatus is not correctly received. The negative acknowledgment carries second indication information. The second indication information is used to indicate to retransmit, by using HARQ, data that is in the first MPDU and that is not correctly received, and is further used to indicate the second communications apparatus to send, to the first communications apparatus after receiving a feedback request from the first communications apparatus, feedback information of a PPDU in which the retransmitted data is located.

The receiving unit 2200 is configured to receive a second PPDU from the first communications apparatus. The second PPDU retransmits, by using the HARQ, the data that is in the first MPDU and that is not correctly received.

The receiving unit 2200 is further configured to receive the feedback request from the first communications apparatus.

The sending unit 2100 is further configured to send the feedback information of the second PPDU to the first communications apparatus.

In another embodiment, the communications apparatus 2000 may correspond to the second communications apparatus in the method 600. In this case, functions of each unit of the communications apparatus 2000 are described as follows.

The sending unit 2100 is configured to send a negative acknowledgment to the first communications apparatus. The negative acknowledgment is used to indicate that a first MPDU included in a first PPDU sent by the first communications apparatus to the second communications apparatus is not correctly received.

The receiving unit 2200 is configured to receive a second PPDU from the first communications apparatus. The second PPDU includes a second MPDU and an additional part, and the second PPDU retransmits, by using HARQ, data that is in the first MPDU and that is not correctly received. A sum of duration of the additional part and a short inter-frame space SIFS is greater than duration required by the second communications apparatus to feed back to the first communications apparatus whether an MPDU to which retransmitted data belongs is correctly received.

Optionally, in an embodiment, the sending unit 2100 is further configured to send capability information of the communications apparatus to the first communications apparatus, where the capability information is used to indicate the duration required by the second communications apparatus to feed back to the first communications apparatus whether the MPDU to which the retransmitted data belongs is correctly received.

Optionally, in an embodiment, the additional part is padding of the second MPDU, or the additional part is newly transmitted data.

Optionally, in an embodiment, the capability information is used to indicate a delay for the communications apparatus to feed back to the first communications apparatus whether the MPDU to which the retransmitted data belongs is correctly received.

Optionally, in an embodiment, the capability information is used to indicate maximum duration that is of a PPDU in which the retransmitted data is located and that is acceptable to the communications apparatus, and/or a maximum quantity of MPDUs to which the retransmitted data belongs.

Optionally, in an embodiment, the receiving unit 2200 is configured to receive the second PPDU from the first communications apparatus. The second PPDU includes the second MPDU and the additional part, and the duration required by the communications apparatus to feed back to the first communications apparatus whether the MPDU to which the retransmitted data belongs is correctly received is longer than the SIFS.

Optionally, in an embodiment, that the capability information is used to indicate the duration required by the second communications apparatus to feed back to the first communications apparatus whether the MPDU to which the retransmitted data belongs is correctly received includes: The capability information carries a level identifier corresponding to the duration required by the second communications apparatus to feed back to the first communications apparatus whether the MPDU to which the retransmitted data belongs is correctly received, where different duration required by the second communications apparatus to feed back to the first communications apparatus whether the MPDU to which the retransmitted data belongs is correctly received corresponds to different level identifiers.

In yet another embodiment, the communications apparatus 2000 may correspond to the second communications apparatus in the method 900. In this case, the communications apparatus 2000 may further include a processing unit 2300. Functions of each unit of the communications apparatus 2000 are described as follows.

The receiving unit 2200 is configured to receive, on a first link, a first preamble sent by the first communications apparatus, and receive data starting from a moment when the first preamble ends.

The processing unit 2300 is configured to: when the first preamble is not correctly received, control the sending unit 2100 not to provide a feedback to the first communications apparatus.

Optionally, in an embodiment, the first preamble includes an indication field, and the indication field is used to indicate the second communications apparatus to feed back whether the first preamble is correctly received after receiving the first preamble.

Optionally, in an embodiment, the receiving unit 2200 is further configured to receive a second preamble from the first communications apparatus, and receive the retransmitted data starting from a moment when the second preamble ends.

The processing unit 2300 is further configured to: in a case in which it is determined that the receiving unit 2200 correctly receives the second preamble on the first link, control the sending unit 2100 to send second feedback information to the first communications apparatus on a second link, where the second feedback information is used to indicate that the communications apparatus correctly receives the second preamble.

Optionally, in an embodiment, the receiving unit 2200 is further configured to receive, on the first link, a detection signal from the first communications apparatus.

The sending unit 2100 is further configured to send a response signal to the first communications apparatus by using the second link, where the second link is one of available links of the communications apparatus.

Optionally, in an embodiment, the detection signal includes RTS and/or CTS.

In an embodiment, the communications apparatus 2000 may be the receive end device in the method embodiments of this application, or may be a combined device, a component, or the like that may have a function of the second communications apparatus in the receive end device. In this embodiment, the sending unit 2100 may be a transmitter, and the receiving unit 2200 may be a receiver. The transmitter and the receiver may be physically integrated into a transceiver. The processing unit 2200 may be a processing apparatus.

In another embodiment, the communications apparatus 2000 may be a chip or an integrated circuit installed in the receive end device. In this embodiment, the sending unit 2100 and the receiving unit 2200 may be communications interfaces. For example, the sending unit 2100 may be an output interface or an output circuit. The receiving unit 2200 may be an input interface or an input circuit. The processing unit 2200 may be a processing apparatus.

A function of the processing apparatus may be implemented by hardware, or may be implemented by hardware executing corresponding software.

For example, the processing apparatus may include one or more memories and one or more processors, where the one or more memories are configured to store a computer program, and the one or more processors read and execute the computer program stored in the one or more memories, so that the communications apparatus 2000 performs an operation and/or processing performed by the second communications apparatus in the method embodiments of this application.

Optionally, the processing apparatus may include only the processor, and the memory configured to store the computer program is located outside the processing apparatus. The processor is connected to the memory by using a circuit/wire to read and execute the computer program stored in the memory.

Optionally, the sending unit 2100 and the receiving unit 2200 may be integrated into a radio frequency apparatus, and the processing unit 2300 may be a baseband apparatus, an SoC, or the like.

Figure 13:
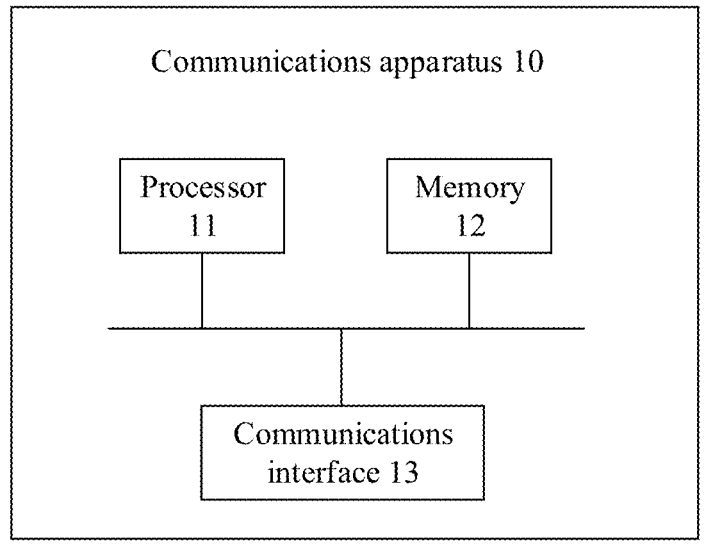
FIG. 13 is a schematic diagram of a structure of a communications apparatus 10 according to this application.

FIG. 13 is a schematic diagram of a structure of a communications apparatus 10 according to this application. As shown in FIG. 13, the communications apparatus 10 includes one or more processors 11, one or more memories 12, and one or more communications interfaces 13. The processor 11 is configured to control the communications interface 13 to send and receive a signal, the memory 12 is configured to store a computer program, and the processor 11 is configured to invoke the computer program from the memory 12 and run the computer program, to perform processing and/or an operation performed by the first communications apparatus in the method embodiments of this application.

For example, the processor 11 may have functions of the processing unit 1300 shown in FIG. 11, and the communications interface 13 may have functions of the receiving unit 1100 and the sending unit 1200 shown in FIG. 11. For details, refer to the description in FIG. 11. Details are not described herein again.

Figure 14:
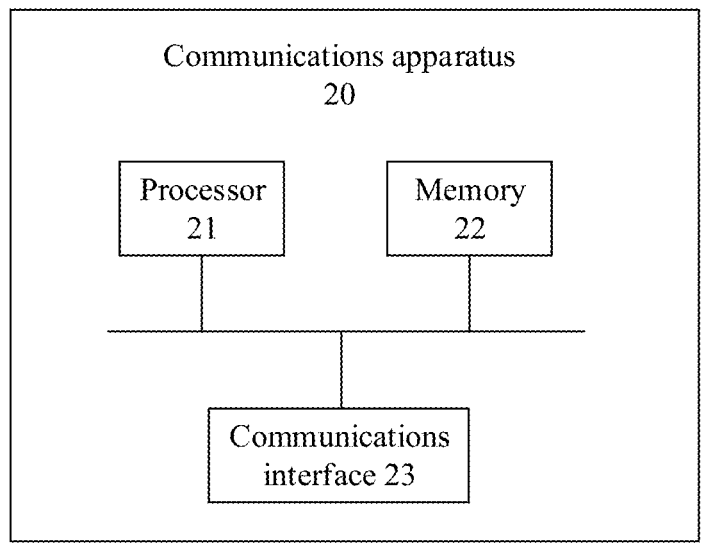
FIG. 14 is a schematic diagram of a structure of a communications apparatus 20 according to this application.

FIG. 14 is a schematic diagram of a structure of a communications apparatus 20 according to this application. As shown in FIG. 14, the communications apparatus 20 includes one or more processors 21, one or more memories 22, and one or more communications interfaces 23. The processor 21 is configured to control the communications interface 23 to send and receive a signal, the memory 22 is configured to store a computer program, and the processor 21 is configured to invoke the computer program from the memory 22 and run the computer program, to perform processing and/or an operation performed by the second communications apparatus in the method embodiments of this application.

For example, the processor 21 may have functions of the processing unit 2300 shown in FIG. 12, and the communications interface 23 may have functions of the sending unit 2100 and the receiving unit 2200 shown in FIG. 12. For details, refer to the description in FIG. 12. Details are not described herein again.

Optionally, the memory and the processor in the foregoing apparatus embodiments may be physically independent units, or the memory and the processor may be integrated together.

In addition, this application further provides a computer-readable storage medium. The computer-readable storage medium stores computer instructions; and when the computer instructions are run on a computer, the computer is enabled to perform an operation and/or processing performed by the first communications apparatus in the method embodiments of this application.

This application further provides a computer-readable storage medium. The computer-readable storage medium stores computer instructions; and when the computer instructions are run on a computer, the computer is enabled to perform an operation and/or processing performed by the second communications apparatus in the method embodiments of this application.

This application further provides a computer program product. The computer program product includes computer program code. When the computer program code is run on a computer, the computer is enabled to perform an operation and/or processing performed by the first communications apparatus in the method embodiments of this application.

This application further provides a computer program product. The computer program product includes computer program code. When the computer program code is run on a computer, the computer is enabled to perform an operation and/or processing performed by the second communications apparatus in the method embodiments of this application.

This application further provides a chip, where the chip includes one or more processors, and one or more memories configured to store a computer program are independently disposed outside of the chip. The one or more processors are configured to execute the computer program stored in the one or more memories, to perform an operation and/or processing performed by the first communications apparatus in the method embodiments.

Further, the chip may further include one or more communications interfaces. The one or more communications interfaces may be an input/output interface, an input/output circuit (namely, an interface circuit), or the like.

Further, the chip may further include the one or more memories.

This application further provides a chip, where the chip includes one or more processors, and one or more memories configured to store a computer program are independently disposed outside of the chip. The one or more processors are configured to execute the computer program stored in the one or more memories, to perform an operation and/or processing performed by the second communications apparatus in the method embodiments.

Further, the chip may further include one or more communications interfaces. The one or more communications interfaces may be an input/output interface, an input/output circuit, or the like.

Further, the chip may further include the one or more memories.

This application further provides a communications apparatus, including a processor and an interface circuit, where the interface circuit is configured to receive and transmit computer code or instructions to the processor, and the processor is configured to run the computer code or instructions, to perform an operation and/or processing performed by the first communications apparatus in the method embodiments.

This application further provides a communications apparatus, including a processor and an interface circuit, where the interface circuit is configured to receive and transmit computer code or instructions to the processor, and the processor is configured to run the computer code or instructions, to perform an operation and/or processing performed by the second communications apparatus in the method embodiments.

In addition, this application further provides a wireless communications system, including the first communications apparatus and the second communications apparatus in the embodiments of this application.

The processor in this embodiment of this application may be an integrated circuit chip, and has a signal processing capability. In an embodiment process, the operations in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA), another programmable logic device, a discrete gate or a transistor logic device, or a discrete hardware component. The general-purpose processor may be a microprocessor, or the processor may be any conventional processor or the like. The operations of the methods disclosed in embodiments of this application may be directly executed and completed by using a hardware encoding processor, or may be executed and completed by using a combination of hardware and software modules in the encoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

The memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through examples but not limitative description, RAMs in many forms are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memories of the systems and methods described in this specification are intended to include but are not limited to these memories and a memory of any other proper type.

The terms such as "unit" and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside within the process and/or the execution thread. The components may be located on one computer and/or distributed between two or more computers. In addition, these components may be executed from various computer-readable media that store various data structures. The components may communicate by using a local and/or remote process based on a signal having one or more data packets (for example, data from two components interacting with another component in a local system, a distributed system, and/or a network such as the Internet interacting with another system by using the signal).

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described systems, apparatuses, and units, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, function units in embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions in this application essentially, or a part contributing to a conventional technology, or some of the technical solutions may be implemented in a form of a software product. The computer software product is stored in a storage medium, and includes several instructions for indicating a computer device (which may be a personal computer, a server, a network device, or the like) to perform all or some of the operations of the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A feedback information sending method, comprising:
receiving, by a first communications apparatus, a negative acknowledgment from a second communications apparatus, wherein the negative acknowledgment indicates that a first media access control protocol data unit (MPDU) comprised in a first physical protocol data unit (PPDU) sent by the first communications apparatus to the second communications apparatus is not correctly received; and sending, by the first communications apparatus, a second PPDU to the second communications apparatus based on capability information of the second communications apparatus, wherein the capability information indicates a duration required by the second communications apparatus to feed back to the first communications apparatus whether an MPDU to which retransmitted data belongs is correctly received; and the second PPDU comprises a second MPDU and an additional part, the second PPDU retransmits, by using hybrid automatic repeat request (HARQ), data that is in the first MPDU and that is not correctly received, and a sum of a duration of the additional part and a short inter-frame space (SIFS) that is greater than the duration indicated by the capability information.

2. The method according to claim 1, wherein the method further comprises:
receiving, by the first communications apparatus, the capability information from the second communications apparatus.

3. The method according to claim 1, wherein the additional part is padding of the second MPDU, or the additional part is newly transmitted data.

4. The method according to claim 1, wherein the capability information indicates a delay for the second communications apparatus to feed back to the first communications apparatus whether the MPDU to which the retransmitted data belongs is correctly received.

5. The method according to claim 1, wherein the capability information comprises an indication of: a maximum duration that is of a PPDU in which the retransmitted data is located and that is acceptable to the second communications apparatus, a maximum quantity of MPDUs to which the retransmitted data belongs, or a combination thereof.

6. The method according to claim 1, wherein before the sending, by the first communications apparatus, the second PPDU to the second communications apparatus based on the capability information, the method further comprises:
when the duration indicated by the capability information is longer than the SIFS, adding, by the first communications apparatus, the additional part after the second MPDU based on the capability information to generate the second PPDU.

7. The method according to claim 1, wherein that the capability information indicates the duration required by the second communications apparatus to feed back to the first communications apparatus whether an MPDU to which retransmitted data belongs is correctly received comprises:
carrying, by the capability information, a level identifier corresponding to the duration required by the second communications apparatus to feed back to the first communications apparatus whether the MPDU to which the retransmitted data belongs is correctly received, wherein different durations required by the second communications apparatus to feed back to the first communications apparatus whether the MPDU to which the retransmitted data belongs is correctly received correspond to different level identifiers.

8. A feedback information sending method, comprising:
sending, by a second communications apparatus, a negative acknowledgment to a first communications apparatus, wherein the negative acknowledgment indicates that a first media access control protocol data unit (MPDU) comprised in a first physical protocol data unit (PPDU) sent by the first communications apparatus to the second communications apparatus is not correctly received; and receiving, by the second communications apparatus, a second PPDU from the first communications apparatus, wherein the second PPDU comprises a second MPDU and an additional part, the second PPDU retransmits, by using hybrid automatic repeat request (HARQ), data that is in the first MPDU and that is not correctly received, and a sum of a duration of the additional part and a short inter-frame space (SIFS) that is greater than a duration required by the second communications apparatus to feed back to the first communications apparatus whether an MPDU to which retransmitted data belongs is correctly received.

9. The method according to claim 8, wherein the method further comprises:
sending, by the second communications apparatus, capability information of the second communications apparatus to the first communications apparatus, wherein the capability information indicates the duration required by the second communications apparatus to feed back to the first communications apparatus whether the MPDU to which the retransmitted data belongs is correctly received.

10. The method according to claim 8, wherein the additional part is padding of the second MPDU, or the additional part is newly transmitted data.

11. The method according to claim 9, wherein the capability information indicates a delay for the second communications apparatus to feed back to the first communications apparatus whether the MPDU to which the retransmitted data belongs is correctly received.

12. The method according to claim 9, wherein the capability information comprises an indication of: a maximum duration that is of a PPDU in which the retransmitted data is located and that is acceptable to the second communications apparatus, a maximum quantity of MPDUs to which the retransmitted data belongs, or a combination thereof.

13. The method according to claim 8, wherein the receiving, by the second communications apparatus, the second PPDU from the first communications apparatus comprises:
when the duration required by the second communications apparatus to feed back to the first communications apparatus whether the MPDU to which the retransmitted data belongs is correctly received is greater than the SIFS, the second PPDU received by the second communications apparatus from the first communications apparatus comprises the second MPDU and the additional part.

14. The method according to claim 9, wherein that the capability information indicates the duration required by the second communications apparatus to feed back to the first communications apparatus whether an MPDU to which retransmitted data belongs is correctly received comprises:
carrying, by the capability information, a level identifier corresponding to the duration required by the second communications apparatus to feed back to the first communications apparatus whether the MPDU to which the retransmitted data belongs is correctly received, wherein different durations required by the second communications apparatus to feed back to the first communications apparatus whether the MPDU to which the retransmitted data belongs is correctly received correspond to different level identifiers.

15. A communications apparatus operating as a first communications apparatus, comprising:
- at least one memory storing a computer program or instructions; and
- at least one processor, coupled to the at least one memory, the at least one processor is configured to execute the computer program or instructions stored in the at least one memory, cause the communications apparatus to:
  - receive a negative acknowledgment from a second communications apparatus, wherein the negative acknowledgment indicates that a first media access control protocol data unit (MPDU) comprised in a first physical protocol data unit (PPDU) sent by the first communications apparatus to the second communications apparatus is not correctly received, and
  - send a second PPDU to the second communications apparatus based on capability information of the second communications apparatus, wherein the capability information indicates a duration required by the second communications apparatus to feed back to the first communications apparatus whether an MPDU to which retransmitted data belongs is correctly received; and the second PPDU comprises a second MPDU and an additional part, the second PPDU retransmits, by using hybrid automatic repeat request (HARQ), data that is in the first MPDU and that is not correctly received, and a sum of duration of the additional part and a short inter-frame space (SIFS) that is greater than the duration indicated by the capability information.

16. The communications apparatus according to claim 15, wherein the computer program or instructions stored in the at least one memory, which when executed by the at least one processor further cause the communications apparatus to:
- receive the capability information from the second communications apparatus.

17. The communications apparatus according to claim 15, wherein the capability information indicates a delay for the second communications apparatus to feed back to the first communications apparatus whether the MPDU to which the retransmitted data belongs is correctly received.

18. The communications apparatus according to claim 15, wherein the capability information comprises an indication of: a maximum duration that is of a PPDU in which the retransmitted data is located and that is acceptable to the second communications apparatus, a maximum quantity of MPDUs to which the retransmitted data belongs, or a combination thereof.

19. The communications apparatus according to claim 15, wherein the computer program or instructions stored in the at least one memory, which when executed by the at least one processor further cause the communications apparatus to:
- add the additional part after the second MPDU based on the capability information to generate the second PPDU when the duration indicated by the capability information is longer than the SIFS.

20. The communications apparatus according to claim 15, wherein that the capability information indicates the duration required by the second communications apparatus to feed back to the first communications apparatus whether an MPDU to which retransmitted data belongs is correctly received comprises:
- carrying, by the capability information, a level identifier corresponding to the duration required by the second communications apparatus to feed back to the first communications apparatus whether the MPDU to which the retransmitted data belongs is correctly received, wherein different durations required by the second communications apparatus to feed back to the first communications apparatus whether the MPDU to which the retransmitted data belongs is correctly received correspond to different level identifiers.

* * * * *